United States Patent [19]

Safiuddin

[11] Patent Number: 4,513,232
[45] Date of Patent: Apr. 23, 1985

[54] GENERAL PURPOSE AND OPTIMAL LENGTH CONTROLLER FOR CYCLIC DUTY MOTOR DRIVES

[75] Inventor: Mohammed Safiuddin, Williamsville, N.Y.

[73] Assignee: Westinghouse Electric Corp., Pittsburgh, Pa.

[21] Appl. No.: 498,607

[22] Filed: May 27, 1983

[51] Int. Cl.³ .................. H02P 5/06; G06F 15/46
[52] U.S. Cl. .................... 318/341; 318/384; 318/393; 364/468
[58] Field of Search .............. 318/341, 270, 326, 327, 318/384, 393, 463; 364/468, 469, 475

[56] References Cited

U.S. PATENT DOCUMENTS 3,737,751  6/1973  Lima .................. 318/341 X
3,836,833  9/1974  Harris et al. .............. 318/270

OTHER PUBLICATIONS

O. V. Slezhanoskii/Elektrichestvo, Moscow, No. 4, 23-31, 1959.
In P. Petrov, "Variational Methods in Optimum Control Theory", pp. 51-67 and 151-163, Academic Press, New York and London, 1968.
Larry Enterline and John Davison, "Mechanics and Positioning Control of Feeder Drives", *The Magazine of Industrial Motion and Control*, Mar. 1982, pp. 47-50 and Apr. 1982, pp. 41-44.

*Primary Examiner*—Ulysses Weldon
*Attorney, Agent, or Firm*—C. M. Lorin

[57] ABSTRACT

A general purpose length controller to be associated with a cyclic-duty motor drive contains stored digital data representing a standard parabolic speed profile $\omega = 4(\bar{t} - \bar{t}^2)$, and a scaling function automatically scales up such standard profile to match the motor drive maximum speed, the desired duty-cycle and the desired material length over which such cyclic-duty motor drive processes material being fed for mechanical treatment.

7 Claims, 26 Drawing Figures ively, for linear profiles of the
GENERAL PURPOSE AND OPTIMAL LENGTH CONTROLLER FOR CYCLIC DUTY MOTOR DRIVES

BACKGROUND OF THE INVENTION

The invention relates to motor drive systems, in general, and more particularly to cyclic duty motor drive systems.

In cyclic duty motor drives, high and repeated accelerations and decelerations constitute the major portion of the operating cycle. Therefore, the operating efficiency of the system depends to a great extent on the losses during acceleration and deceleration only.

The conventional approach to control of a cyclic duty motor drive has been to generate either linear ramps or a combination of linear and flat speed profiles. See for instance "Mechanics and Positioning Control of Feeder Drives" by Larry Enterline and John Davison" in *The Magazine of Industrial Motion and Control* March 1982, pp. 47-50 and April 1982, pp. 41-44. The aforementioned articles also suggest the use of microprocessing within a digital length controller.

Optimal control of a cyclic duty motor drive system of such performance index as will minimize losses is essential. Optimal control is also desirable taking advantage of modern microprocessor-based controller techniques, in particular, on adjustable speed drives operating on a load moved from one position to another within a specified amount of time, e.g., a motor drive embodying what is known as a "length controller". Typical applications thereof are the feed-to-stop and the flying die, or rotary shear systems. The present invention will be described hereinafter in this particular context.

SUMMARY OF THE INVENTION

The present invention resides in a length controller associated with the speed controller of a cyclic duty motor drive system operable from zero speed to maximum speed at successive speed levels for processing material over a length defined by the occurrence of such speed levels up to maximum speed.

The length controller according to the invention contains stored values of a standard parabolic speed profile, preferably based on per-unit of motor rated speed and per-unit of rated strokes per minute (SPM). A scaling function within the length controller establishes with the standard parabolic profile a speed reference for the speed controller as a function of time which is scaled to the operating characteristics of the particular motor drive being controlled by the length controller. This scaling function is selected by the operator in accordance with a desired length (L), the motor maximum duty cycle (SPM), and the motor rated speed ($\omega_R$).

Whenever the assigned length exceeds, within the limits of operability of the motor drive, the capability of the basic speed profile a predetermined flat profile at maximum speed level is automatically added extending the operation before deceleration to zero.

BRIEF DESCRIPTION OF THE DRAWINGS

FIG. 8A is an equivalent circuit symbolizing the generalized mechanical system of a speed source and its associated torque sink or load impedance, while

DETAILED DESCRIPTION OF THE INVENTION

For the purpose of the description of the invention hereinafter, the thesis by Mohammed Safiuddin dated June 1982 and submitted to the Faculty of the Graduate School of State University of New York at Buffalo, entitled "Minimization of Energy Losses in Cyclic Duty Drives by Application of Optimal Control and Microprocessor Techniques" is hereby incorporated by reference.

In order to achieve optimal control of a drive system so as to minimize energy losses in a cyclic duty DC drive, a length controller is used causing the motor drive to have a parabolic speed profile. The optimal length controller used to this effect is a microprocessor system for speed and flexibility of control. The microprocessor-based controller is fully programmable in situ through an operator interface to make it a general purpose length controller.

Cyclic duty drive systems typically include a length controller when implemented for feed-to-stop applications and/or for flying die, or rotary shear systems. For the purpose of this description, the invention will be described primarily in the context of a DC motor drive including a length controller operating in relation to a feed-to-stop application.

In the optimal approach for the design of the length controller according to the invention, it is recognized that a major portion of energy losses in a drive system is due to $I^2R$ losses within the motor. Accordingly, minimization of those losses would result in minimizing energy losses for the entire drive system. Since the copper losses are directly proportional to the square of the current drawn by the motor, and since the armature current depends upon the delivered torque, loss minimization requires minimizing the square of the torque over the operative time interval $T_c$ (duty-cycle period). With a cyclic-duty motor drive, such time interval $T_c$ delineates the repetitive occurrence of accelerations and decelerations, which for a feed-to-stop application, typically characterizes the feed length. The latter is determined by the length controller associated with the motor drive control system. Thus $T_c$ is the time interval within which torque variations occur and are repeated many times a minute at a rapid rate. As explained by the calculations presented in the Appendix of this description under certain constraints, minimization of such square torque variations requires an optimal speed profile characterized by the equation:

$$\bar{\omega} = 4(\bar{t} - \bar{t}^2)$$

where $\bar{\omega}$ is the normalized speed of the drive (e.g., the ratio of actual speed $\omega$ to rated speed $\omega_R$); and $\bar{t}$ is the normalized time interval (e.g., the ratio of actual time $t$ to rated time $t_R$). The rated speed $\omega_R$ is the maximum speed attainable with the motor drive during the duty-cycle period, and $t_R$ is the duty-cycle time as set for the particular cyclic-duty motor drive.

Figure 1:
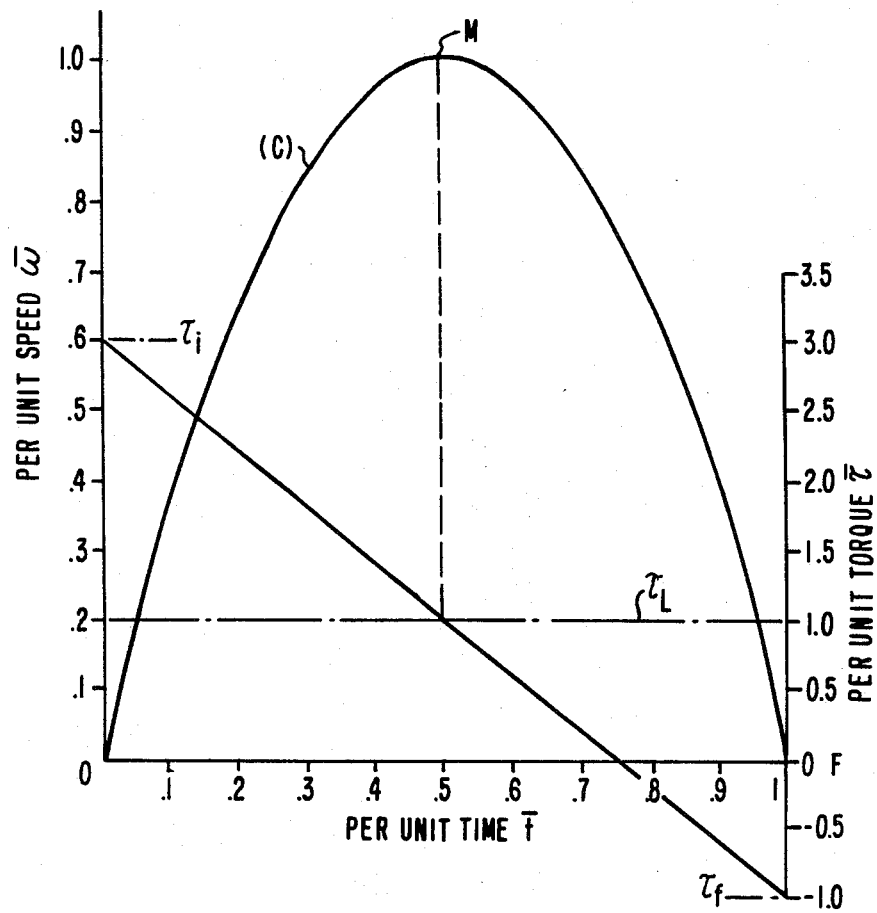
FIG. 1 shows optimal acceleration/deceleration and torque profiles used according to the present invention.
Figure 2A:
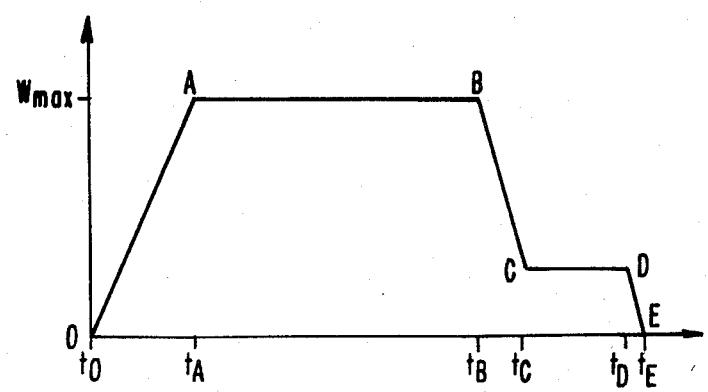
FIGS. 2A-2C are illustrations of ramp and ramp combinations used as speed profiles by the prior art.
Figure 2B:
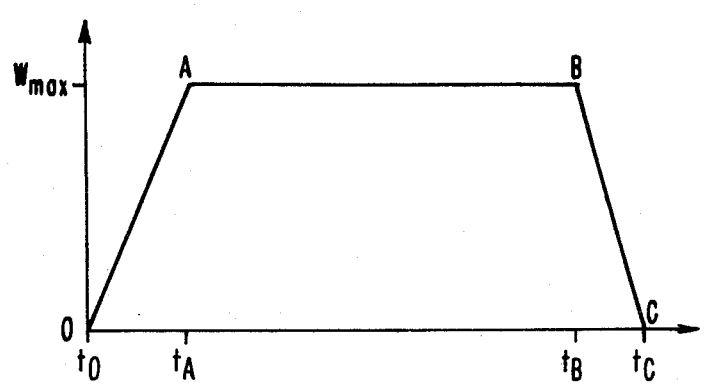
Figure 2C:
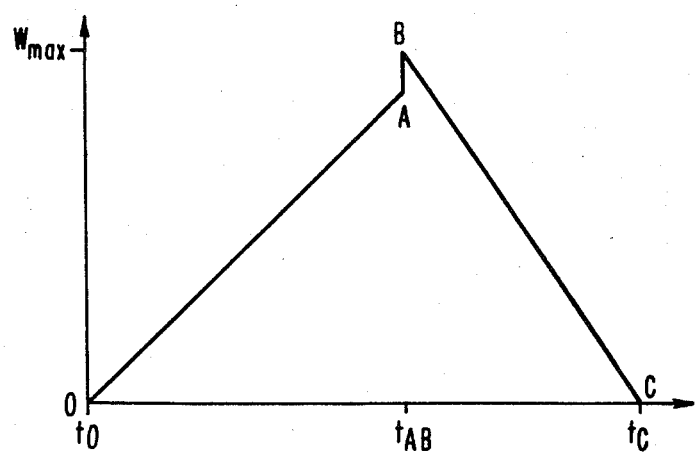

Reference is made to FIG. 1, where the optimal speed profile (curve (C)) is shown. FIGS. 2A, 2B and 2C show by comparison three conventional ramp profiles for the same duty-cycle period $T_c$.

In FIG. 2A the drive is accelerated from O to A, maintained at maximum speed from A to B (time interval $t_A$-$t_B$), then decelerated from B to C (time interval $T_B$-$t_C$), the intermediate speed defined at C being maintained up to instant $t_D$, and the drive is again decelerated from D to E when zero speed is reached at time $t_E$. The duty-cycle period is $T_c = (t_E - t_O)$. In FIG. 2B the profile is OA, AB, BC with a level AB at maximum speed. In FIG. 2C, the maximum speed is attained at B following a ramp OA, and the drive is immediately decelerated to zero speed along BC within the time interval $T_c$ initiated at the origin.

By contrast, the optimal speed profile of FIG. 1, essentially parabolic with a rounded peak at M near the middle of the period $T_c$, allows a linear optimal torque characteristic from its maximum positive value $\bar{\tau}_i$ at the start, to its maximum negative value $\bar{\tau}_f$ at the end of the period $T_c$. The torque reaches half of $(\bar{\tau}_f - \bar{\tau}_e)$ at the moment of the peak M, e.g., when the motor drive reverses its operation from acceleration to deceleration. On FIG. 1 the load torque $\bar{\tau}_L$ is represented in per-unit torque ($\bar{\tau}$). It is 1.0 during the entire period. The period $T_c$ is also represented in per-unit time ($\bar{t}$). The maximum speed, e.g., the ordinate of operating point M is 1.0, in per-unit speed.

Figure 3:
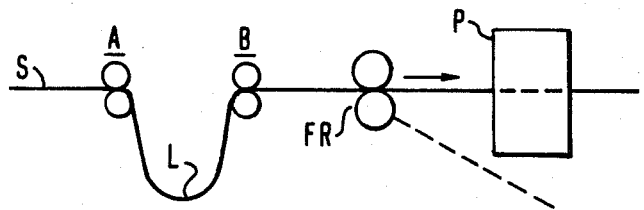
FIG. 3 shows in block diagram a feed-to-stop shear line system embodying the length controller according to the invention.
Figure 3:
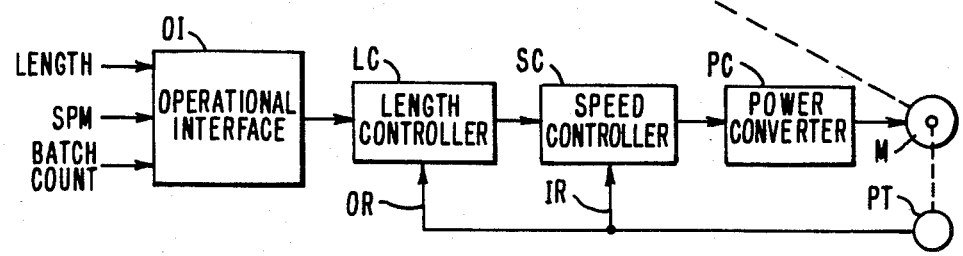

Referring to FIG. 3, the motor drive is shown controlling a feed-to-stop press or shear. A strip of material S is passed between two stands A and B to form a loop of desired length, then fed into feed rolls at FR at the entry of a press, or shear P. The strip enters, is accelerated, run, and decelerated by the feed rolls FR during the time interval $\underline{t}$ so that the length L is passed at the shearing point between two consecutive press, or shearing actions of $\underline{P}$. The drive motor M controls the feed rolls during the time interval $\underline{t}$, then stops. The regulating system associated with the motor includes, according to the present invention, an operator interface circuit OI where the operator sets the input data in terms of the length L, the production rate in strokes per minute SPM, and the batch count BT. A length controller LC is provided which is set with a given length L, a duty-cycle S is SPM and a batch count. These determine the speed profile for the motor regulator, as explained hereinafter. The speed controller SC establishes the speed profile in accordance with the length controller LC. The power converter PC causes the motor M to run as determined by the speed profile from SC. A pulse tachometer PT, provides a feedback signal characteristic of the actual speed. The length controller LC and speed controller SC are controlled in accordance with speed by an inner feedback loop IR and an outer feedback loop OR, respectively.

Figure 4:
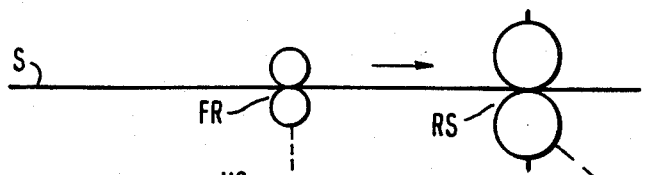
FIGS. 4 and 5 are like FIG. 3 except that they are in the situation of a rotary shear cut-to-length line and a flying cut-off shear line, respectively.
Figure 4:
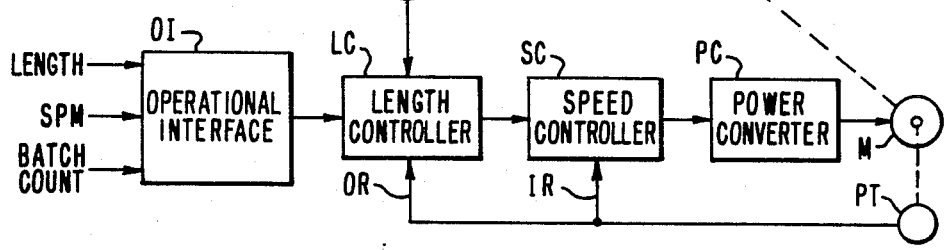
Figure 5:
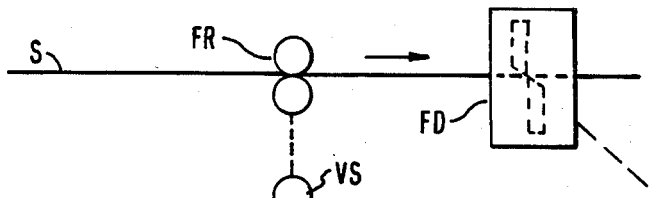
Figure 5:
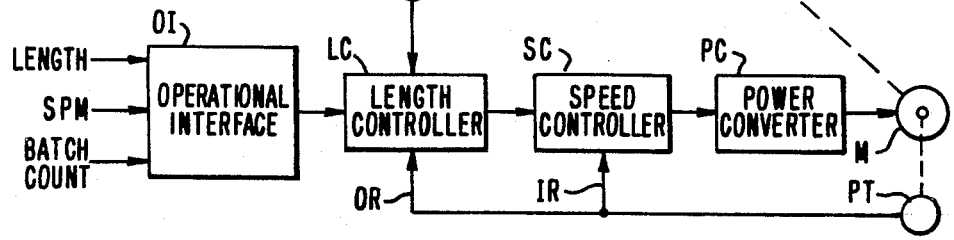

FIGS. 4 and 5 show the operator interface circuit OI and the length controller LC according to the invention inserted with a motor drive system in the case of a rotary shear application (FIG. 4) and of a flying-die shear application (FIG. 5).

As shown in FIG. 4 the strip S is fed by feed rolls FR at constant speed, while the rotary shear RS is being controlled by the motor drive M so as to accelerate until impact in the time interval $\underline{t}$ determining the length L of strip to be cut. As shown in FIG. 5, the same organization as in FIG. 4 is provided around a motor M controlling the movement of the flying-die FD upon each cutting cycle from an initial position to a home position.

Figure 6:
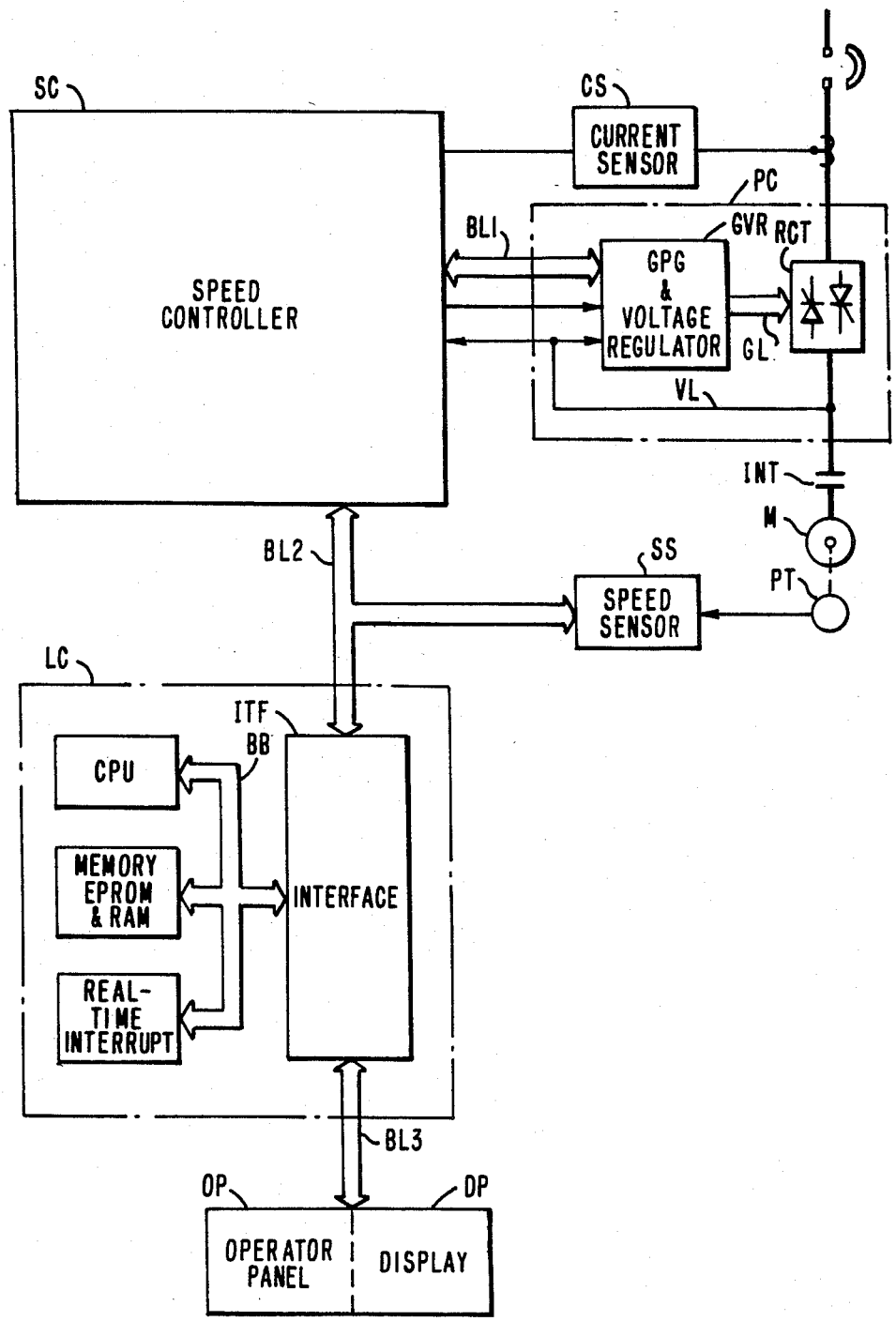
FIG. 6 is a block diagram representation of the speed regulator system of a cyclic-duty motor drive embodying the length controller according to the present invention.

Referring to FIG. 6, the speed regulator system of the motor drive of FIGS. 3, 4, or 5 is illustrated as including a speed controller SC and a length controller LC which is part of a microcomputer-based system. The motor M is selectively inserted in circuit with the output line DCL of the rectifier unit RCT by closing a normally open interrupter INT. Within the power converter unit PC, the static switches of the rectifier unit RCT are controlled for conduction by a gate pulse generator and voltage regulator unit GVR. The voltage regulator is part of a control system including a conventional current sensor (CS) loop and a voltage loop VL. Digital control of the gate pulse generator and voltage regulator unit is provided from the speed controller SC via bus lines $BL_1$. The gate pulse generator controls the SCR devices of the rectifier unit RCT via gate lines GL. A digital speed feedback control loop including a speed sensor SS responsive to a pulse tachometer PT controls the speed controller via bus lines $BL_2$.

The length controller includes a CPU, a memory (EPROM and RAM) unit and a real time interrupt unit, all connected by bilateral bus bar lines BL between themselves and with an interface unit ITF. Serial data communication from a host computer or from the operator console may be provided by serial data lines communicating with the interface unit ITF. The optimal length controller LC according to the invention is digital and is communicating via bus lines BL$_2$ through the interface circuit ITF with the speed controller, namely, with the CPU and the memory unit therein, under real time interrupt supervision. The length controller also responds to operator information set by the operator, for instance from an operator panel OP via bus lines BL$_3$, or via the serial data lines, and to the speed feedback loop from bus lines BL$_2$. Display of the motor drive status and modes of operation are provided by a display unit DP connected via bus lines BL$_3$. In operation, the length set point defined by the operator (at OP) causes the length controller to establish a speed reference position command on lines BL$_2$ which is compared within the speed controller with the speed feedback signal also derived via lines BL$_2$, thereby to cause the speed regulator to conform with the speed profile defined for the particular length and related to a standard profile stored within the length controller LC as explained hereinafter.

Figure 7:
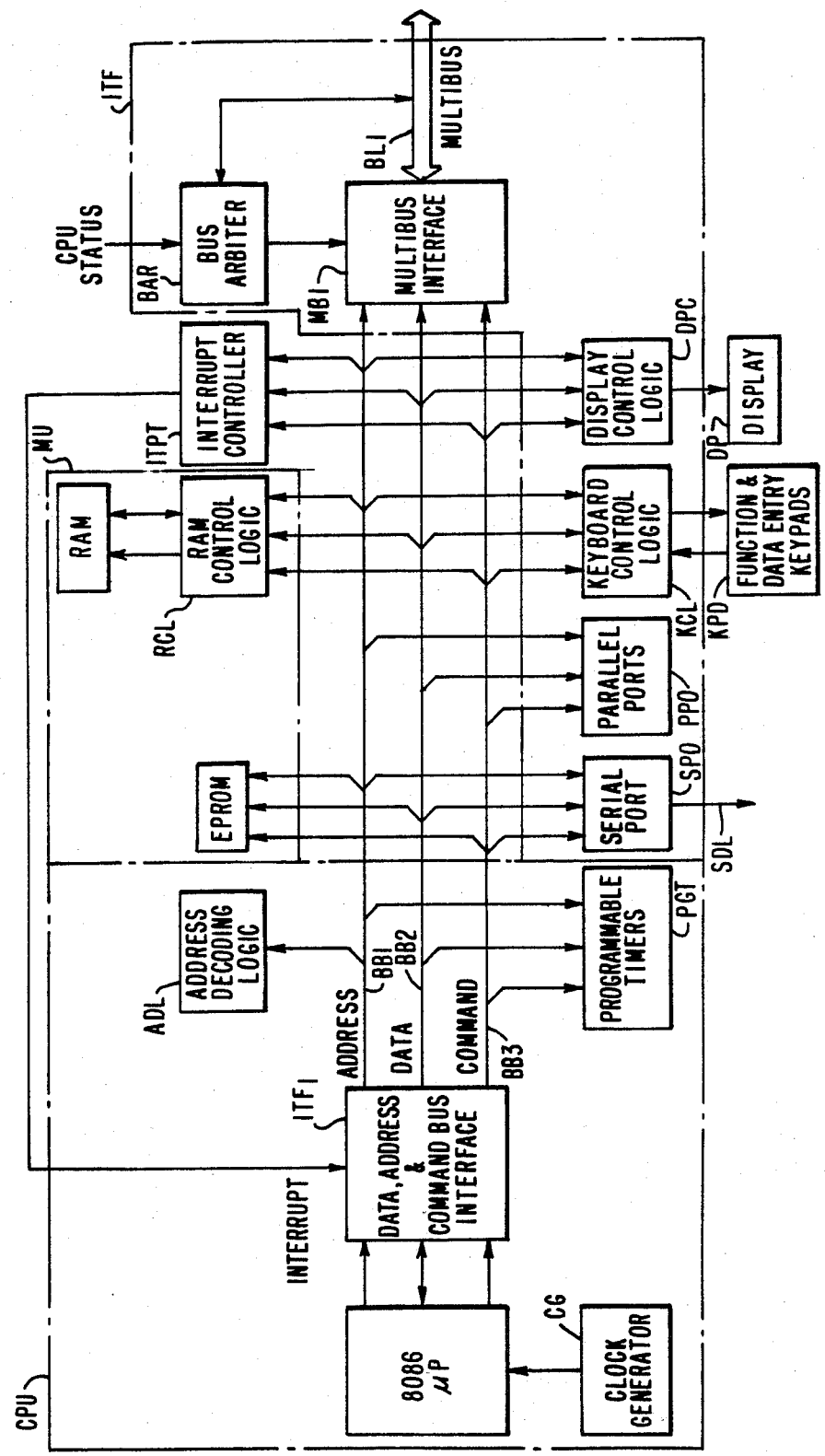
FIG. 7 illustrates in the context of a single-board computer system hardware configuration that can be used with the length controller according to the invention.

Referring to FIG. 7, assuming an Intel SBC 86/12 single board computer-based implementation, the length controller hardware organization is shown to include multiplexed address bus BB1, data bus BB2 and command bus BB3, which connect with a multibus interface MBI within the interface ITF. The CPU includes a clock generator CG, an 8086 microprocessor (UP) which has its own data, address and command bus interface with BB1, BB2, and BB3. It also includes an address decoding logic ADL, and programmable timers PGT. Busses BB1, BB2, BB3 are connected with the memory unit MU which includes the EPROM and the dual RAM having its own RAM control logic RCL. The interface ITF also includes: a serial port SPO communicating through serial data line SDL with a host computer if any; parallel ports PPO; a keyboard control logic KCL communicating with the function and data entry keyboards KPD of the operator panel OP; a display control logic DPC communicating with the display unit DP. All these are interconnected with or through busses BB1, BB2, BB3. From the multibus interface MBI, a multibus BL$_2$ communicates with the speed controller SC. An interrupt controller ITPT connected to busses BB1, BB2, BB3, controls the data address and command bus interface of the CPU. The SBC 86/12 computer is an 8086 microprocessor-based system with 32K bytes capability of the RAM and 16K bytes of the EPROM. The organization and operation of such a system is generally known. Speed measurement through the feedback loop is provided by converting the pulse trains of the pulse-tachometer PT to a 16-bit count accumulated during a sampling time interval. This is the count on BL$_2$ which is compared by the speed controller with the speed reference outputted also on BL$_2$ by the length controller. As a result, the speed controller accelerates, or decelerates the motor drive as prescribed by the length controller.

Referring again to FIG. 1 and the optimal acceleration/deceleration profile, there shown by curve (C), a problem of dynamic optimization is raised, e.g., of finding a system in which the state is a function of time. The performance index, therefore, is expressed as a time integral of the function of states $\underline{X}(t)$ and control inputs $\underline{U}(t)$.

Any analytical solution which yields the values of optimum $U^*(t)$ as a function of $\underline{X}(t)$ is called a close loop solution since the control inputs $\underline{U}(t)$ are generated from the states $\underline{X}(t)$. Where $U^*(t)$ is independent of $\underline{X}(t)$ these are open-loop solutions to the problem.

In another class of dynamic optimization, there are problems which require minimization of time to reach a final state $\underline{X}(t_f)$. This is called a "time optimal" class of problems. The performance index is $$I = \int_{t_o}^{t_f} dt$$

subject to the constraints imposed by the system equations with preset initial and final values.

Optimization techniques are not new, the Calculus of Variations has its origin in the search for a solution to the brachistochrone problem of finding the optimal curve joining two distant given points down which a ball will roll in the least time.

In the context of the present invention, any cyclic duty equipment driven by an adjustable speed drive converts the mechanical input energy into another form producing the desired product. This production process may be of the form in which a load is moved from one position to another, or it may involve material to be processed in a specified amount of time. Therefore, the "length" of material processed or the "distance" by which the load is moved can be considered a common criterion of performance.

Hereinafter, the process equipment is defined as the PLANT to be controlled which inputs in terms of speed $\omega$ and torque $\tau$, or of velocity v and force f. The energy conversion equipment is considered as a controller. The optimization problem is then formulated so as to determine the optimal input functions $\omega^*(t)$ for speed and $\tau^*(t)$ for torque in the case of rotational systems of $v^*(t)$ for velocity and $f^*(t)$ for force in the case of translational systems. A controller designed to produce these signals is called the "optimal controller". The mathematical formulation requires first a differential equation relating the speed $\omega$ and torque $\tau$. Then, the performance index I, must be established with all the necessary constraints.

Figure 8A:
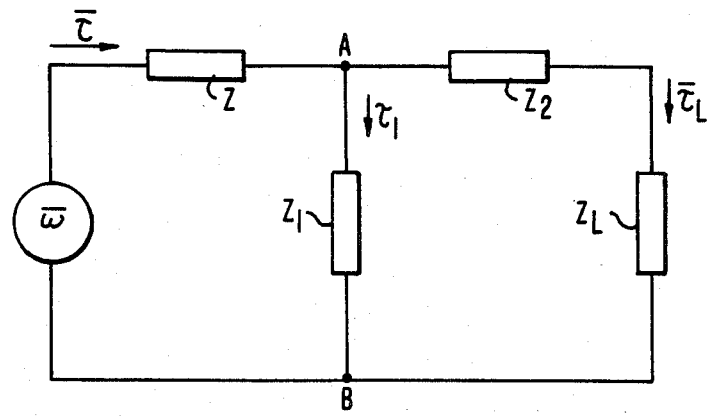

The differential equation necessary to describe the system can be developed from its equivalent circuit model. In its most generalized form, the equivalent circuit model of a generalized mechanical system can be represented as shown in FIG. 8A. In a given particular case, the applicable equivalent circuit is obtained by open-circuiting, or short-circuiting, the appropriate element of the circuit. The impedances Z, Z$_1$, and Z$_2$ represent series/parallel combinations of friction, inertia, and spring components of the system. For most applications, the equivalent circuits are relatively simple and yield first order, or at the most a second order, differential equation for the speed-torque relationship.

Figure 8B:
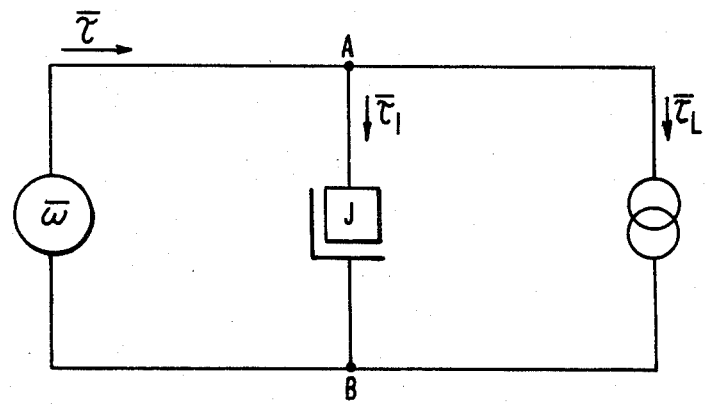
FIG. 8B is an equivalent circut symbolizing the simple inertia system of a speed source and its associated constant torque sink.

For the purpose of explanation, a simple case is chosen of a system which mainly consists of inertia load $\tau_1$ and load torque $(\tau_L)$ independent of the shaft speed. Such equivalent circuit model is given in FIG. 8B. The speed-torque relationship for this system is given by $$\bar{\tau} = \bar{\tau}_L + \frac{J\omega_R}{\tau_R} \frac{d\bar{\omega}}{dt}$$

Where, $\bar{\tau}$ and $\bar{\omega}$ represent normalized values of torque and speed with rated values $\tau_R$ and $\omega_R$.

Generally, a maximum operating speed is defined which meets the production requirements with acceleration and deceleration rates either arbitrarily chosen, or based on short time ratings of the drive motors. Two speed and torque linear duty cycles are shown in FIGS. 9A and 9B, respectively.

Figure 9A:
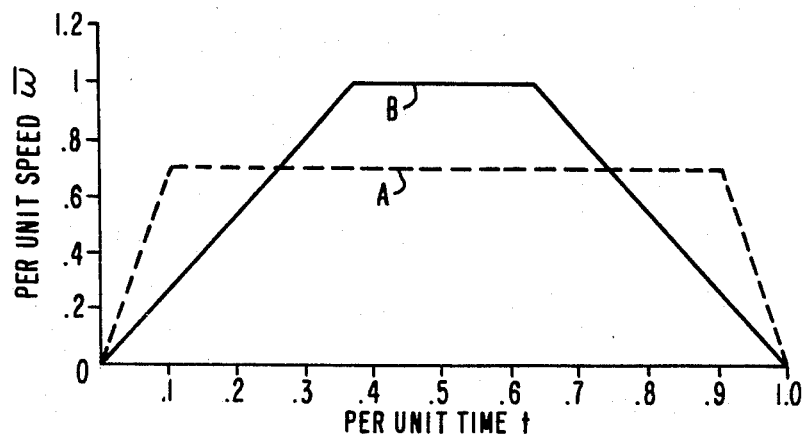
FIGS. 9A and 9B are the per-unit characteristics of speed and torque, respectively, for linear profiles of the prior art under two typical duty cycles, for comparison purposes.
Figure 9B:
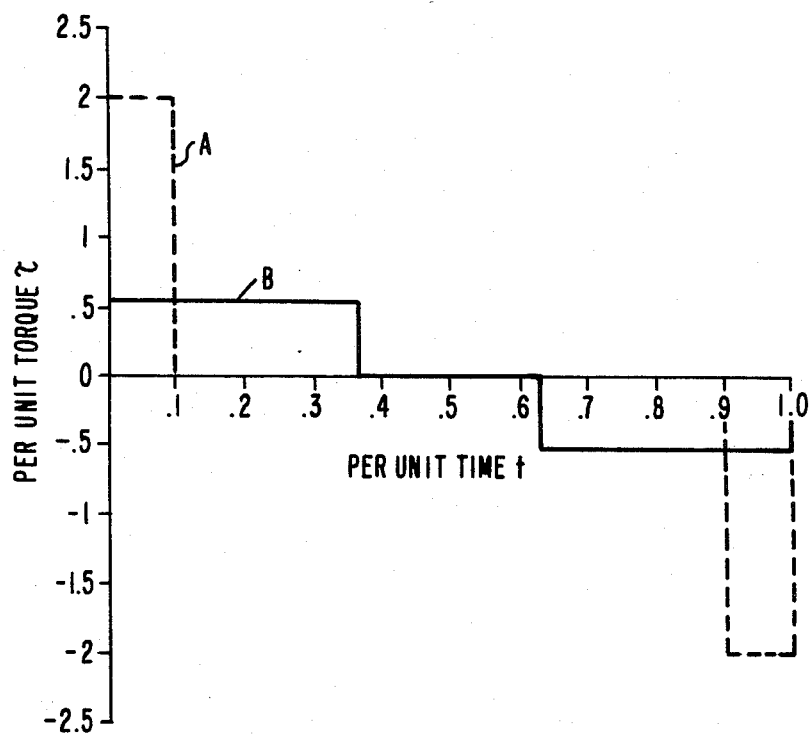

The area under each of the curves (A) or (B) of FIG. 9A is the total length L of the strip processed in the time interval $T_c$=duty cycle period. Curve (A) of FIG. 9A has short ramps and a long maximum profile, curve (B) is in the reverse situation. The first question is: which of the two speed profiles is preferable? This question can be answered provided performance criteria are defined for these two profiles. If the square of torque integrated over the total period $T_c$ is to be the quality criterion, then curve (B) has a lower value than curve (A). However, if the maximum speed is the criterion of quality, then curve (A) is to be preferred over curve (B).

The next question is: what should the criteria be? This is expressed by the performance index.

The AC input energy to a complete drive system can be thought of as including three portions. One portion of the energy is required to do the work of processing the material. Another portion of the energy is stored in the mass of the system and is recoverable. The third portion comprises the losses in the system. It is dissipated in the form of heat. The amount of energy required to do the work (process the material) is independent of how fast, or how slow, the work is done (speed profile) and therefore cannot be minimized. However, most of the energy lost as heat in the electromechanical conversion equipment is directly related to the square of the torque transmitted to the process and therefore can be minimized by defining the "performance index" as the time integral of the square of the torque over the interval t=0 to t=$t_R$ (total process time), in other words:

$$I(\bar{\omega}) = \int_0^{t_R} \bar{\tau}^2 dt$$

The optimization of the acceleration/deceleration profile of a cyclic-duty drive system, therefore, can be stated as requiring to minimize:

$$I(\bar{\omega}) = \int_0^{t_R} \bar{\tau}^2 dt$$

This is subject to the constraints:

$$\bar{\tau} = \bar{\tau}_L + \frac{J\omega_R}{\tau_R} \cdot \frac{d\bar{\omega}}{dt}$$

with boundary values: $\bar{\omega}(0)=0$ and $\dot{\bar{\omega}}(t_f)=0$

These boundary values express that the initial speed of the drive is zero and that the rate of change of final speed at time $t_f$ is also zero. The speed function $\bar{\omega}$ during acceleration has to be determined so as to minimize the losses.

The formulation of the optimization problem for the inertia load case is carried through the following assumptions:

1. It is assumed that no constraints exist on the maximum speed of process itself.

2. It is assumed that the unknown speed function is symmetrical about the time axis $t=(\frac{1}{2})t_R$ Based on these assumptions, the process constraints are as follows:

a. $\int_0^{(\frac{1}{2})t_R} v \, dt = L/2$ b. $v(0) = 0$ c. $\dot{v}(t_f) = \frac{dv}{dt}\bigg|_{t_f} = 0$ These three equations are normalized in terms of the input shaft speed $\omega_R$ by defining the rated speed $V_R$ which leads to:

$$\pi D_r \omega_R = V_R$$

The constraints then become a. $\int_0^{(\frac{1}{2})t_R} \bar{\omega} dt = \frac{1}{2} \cdot \frac{L}{\pi D_r \omega_R}$ b. $\bar{\omega}(0) = 0$ and c. $\bar{\omega}(t_f) = 0$ The optimization problem becomes the problem of minimizing:

$$I(\omega) = \int_0^{(\frac{1}{2})t_R} \bar{\tau}^2 dt$$

under the constraints:

$$\bar{\tau} = \bar{\tau}_L + \frac{J\omega_R}{\tau_R} \cdot \frac{d\bar{\omega}}{dt}$$

$$\int_0^{(\frac{1}{2})t_R} \bar{\omega} dt = \frac{L}{2\pi D_r \omega_r} \; ; \; \bar{\omega}(0) = 0; \; \bar{\omega}(\frac{1}{2})t_R = 0$$

As shown in the Appendix, the solution to this problem leads to an optimal acceleration/deceleration profile given by the equation:

$$\bar{\omega} = 4(\bar{t} - \bar{t}^2) \tag{5}$$

where $\bar{\omega}$ is the speed (rpm) of the motor, and $\bar{t}$ is the duty-cycle period for a given stroke per minute (SPM), in normalized form.

The parabolic acceleration/deceleration profile represented by equation (5) is shown in FIG. 1 by curve (C).

Figure 10:
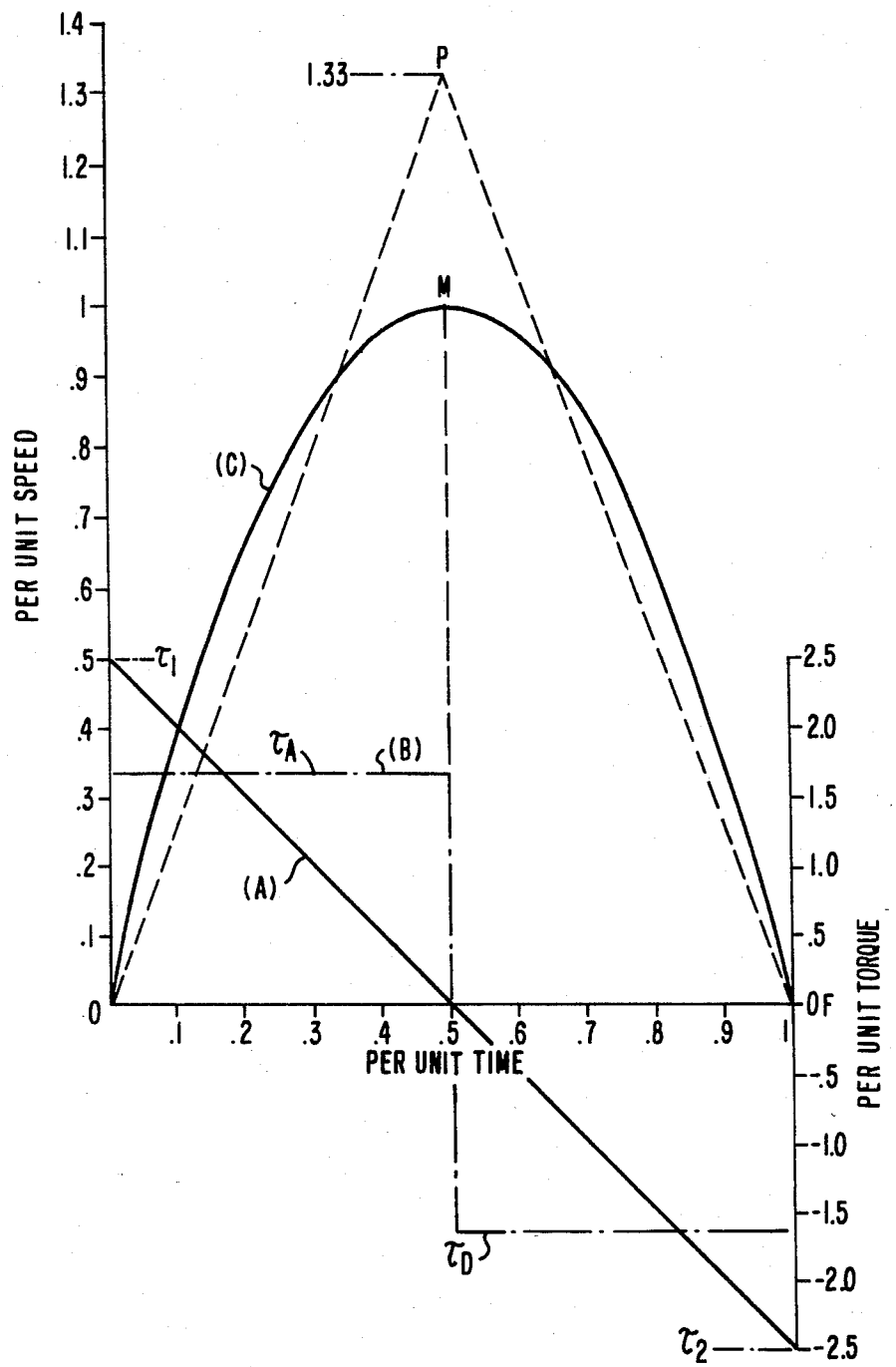
FIG. 10 provides curves comparing a linear acceleration/deceleration profile with the parabolic profile according to the invention.

Referring to FIG. 10, the optimal profile of curve (C) of FIG. 1 is compared with a conventional linear speed profile formed of two ramps of opposite slopes. If the rms horsepower ratings required are compared in terms of process length $L_R$ and $t_R$ seconds, it is observed that the area under the speed profile is the length $L_R$. For the optimal curve, the length $L_R$ is related to $\omega_R$ and $t_R$ by $$L_R = (2\pi D_r / 3 \gamma) \cdot \omega_R \cdot t_R \tag{7}$$

where $\gamma$ is the gear ratio between the motor shaft and the load shaft; where Dr is the feed roll, or drum, diameter selected to produce rated linear speed at rated motor speed $\omega_R$. For the linear acceleration/deceleration curve, the relationship is $$L_R = (\pi Dr/\gamma) \cdot \omega \cdot (\tfrac{1}{2}) t_R \quad (8)$$

Equating (7) and (8):

$$\omega = (4/3)\omega_R$$

$$\bar{\omega} = 4/3$$

Considering now the rms torques for the two profiles, the acceleration torque is proportional to the rate of change of speed. Therefore, for the optimal curve (C) (with $\alpha$ being a proportionality constant), $$\bar{\tau}_{acc} = \alpha\dot{\omega} = 4\alpha(1 - 2\bar{t}) \quad (9)$$

$$\bar{\tau}^2_{acc} = 16\alpha^2(1 + 4\bar{t}^2 - 4\bar{t})$$

Integrating the torque squared function for the period and dividing it by the period 0.5, the rms torque is $$\bar{\tau}_{rms} = \sqrt{\frac{1}{.5} \int_0^{.5} 16\alpha^2(1 + 4\bar{t}^2 - 4\bar{t}) d\bar{t}}$$

$$= \sqrt{\frac{16\alpha^2}{3}} = 2.309\,\alpha$$

It is observed that the maximum value of $\tau_{acc}$ from equation (9) is $4\alpha$ which corresponds to 2.5 p.u. of motor torque and the $\tau$ rms value of 2.309 $\alpha$ corresponds only to 1.44 p.u. of motor torque.

For the linear acceleration/deceleration profile OPF $$\bar{\omega} = \frac{8}{3}\bar{t} \quad (10)$$

and $$\dot{\omega} = \left(\frac{8}{3}\right)$$

thus, $$\bar{\tau}_{rms} = \bar{\tau}_{acc} = \left(\frac{8}{3}\right)\alpha \quad (11)$$

This would, of course, correspond to 1.67 p.u. of motor torque. On a normalized basis, the rms horsepower ratings for the two profiles are:

For the optimal curve (C):

$$HP^* = (\bar{\tau}_{rms})(\bar{\omega}) = (1.44)(1) = 1.44\ p.u.$$

For the linear acceleration/deceleration profile OPF, $$HP^* = (\bar{\tau}_{rms})(\bar{\omega}) = (1.67)\left(\frac{4}{3}\right) = 2.23$$

It appears that the horsepower rating of the motor required for an optimally controlled machine is only 65% of the rating required for a conventionally controlled machine. This reduction in horsepower rating, not only saves on the costs associated with the DC motor, but also in regard to the power conversion equipment and cable connections, etc. Applied to a die accelerator drive of a cut-to-length shear, the savings in the horsepower rating approach in practice 38% together with a considerable reduction for the return speed of the die.

Using the regression model for per-unit losses in DC machines, the energy losses for the two operating cycles can be compared as follows:

$$\text{Energy losses} = \int_0^{\bar{t}_f} \bar{\omega}_{Loss}\,d\bar{t}$$

$$= \int_0^{0.5} (0.126 - 0.956\bar{\tau} + 0.745\bar{\tau}^2\bar{t} +$$

$$0.183\bar{\omega} + .039\omega^2\,d\bar{t},$$

substituting for $\bar{\omega}$ and $\bar{\tau}$, from equations (5) and (9) for the optimal profile (C) and from equations (10) and (11) for the linear profile, and integrating, the following results obtain:
1. for optimal control:
Energy Loss $E_o = 2[0.135 + 1.989\alpha^2 - .0957\alpha]$
2. for linear ramp control:
Energy Loss $E_l = 2[0.136 + 2.65\alpha^2 - 0.128\alpha]$
The ratio of the respective losses $E_o/E_l$ varies from 0.763 to 0.75 as a $\alpha$ varies from 1 to 8.

The optimal acceleration/deceleration profile of FIG. 1 is suitable for high performance cyclic duty servo drives. This area of application covers servo drives used in cut-to-length and press-feed systems requiring very high position accuracies and very fast dynamic responses. Here, the basic requirements are
1. High rates of production (20 to 60 strokes/minute
2. High length accuracies (0.1" to 0.01" for all lengths)
3. Ease of length adjustability Most of the pneumatic and hydraulic systems employed for these applications meet the first two requirements at the sacrifice of the third. The electrical drive system meets the second and the third requirements.

In feed-to-stop applications, the material is pulled from a loop and fed into the shear or the press by a feeder roll. The feeder roll must accelerate, run and decelerate to a stop for each feed.

In the rotary shear applications, the material is constantly fed at some preset speed. The cut-lengths are produced by accelerating the shear to match its peripheral speed to that of the material and then making a cut on the fly. The shear then completes one revolution to return to its parking position. When the cut is made, the shear drive motor is running at a speed proportional to the material speed. Since the energy required to make the cut is supplied by the shear drive, the drive motor tends to slow down and may even stall out if the drive system does not have enough mechanical stored energy.

In slide-die or flying cut-off applications, the material is fed at a preset speed. The cut pieces of desired length are produced by accelerating the die-slide to match the material speed and cut-length. After the cut is completed, the die is reversed and returned to initial position for the next cut.

Of the three categories, the "flying-die" and the "rotary-shear" cut-to-length systems are employed when the product cannot be looped, thus, for metal bars, rods, I-beams, pipes and tubes, for instance.

The feed rolls FR are used to measure the material velocity and position, as well as to provide tension in the material. To this effect, a measuring roll of known circumference (say 16") and a DC motor driven backup roll are provided. The top roll drives a pulse generator which produces 2000 pulses per revolution. These pulses, representing approximately 0.008 inches, are used by the length controller to measure strip position and speed.

The backup roll drive is torque-controlled when the system is in normal operation. The motor torque is controlled when the system is in normal operation. The motor torque is controlled from an operator's control panel.

High performance cyclic duty operation demands conversion of electrical energy into mechanical energy during acceleration, and conversely during deceleration, these at very high rates. High position accuracy expected of the servo drive is coupled to the ability in the motor to make small changes in the shaft position consistently. The ability of the DC motor to accelerate to its rated speed in the shortest time depends upon the "torque-to-inertia" ratio. Air-gap flux density and core lengths are maximized and the armature diameter is minimized to obtain the highest possible such ratio. Since both the speed and armature current change at rapid rates during each operating cycle, the commutator is designed for smooth and spark-free commutation. Any operating cycle which minimizes the rate of change will help the commutation of the machine.

It will now be explained how the length controller according to the invention is implemented and operated in order to provide a speed reference like the speed profile of FIG. 1 for controlling the speed regulator of the motor drive of FIG. 6 under any operative condition set by the operator, such as "length" to be cut, number of "strokes per minute" and batch count.

A cyclic duty motor drive causes mechanical processing of material, through the recurrence of a mechanical process step at the repetitive rate of the cycle period. In a cutting tool operation, for instance, while the strip is being constantly fed by the feed rolls, as shown in FIG. 3, the strip is cut at regular distances determined by the feed roll velocity and by the cycle period. Thus, the length L of the cut workpiece is determined by the time interval within which the motor drive is being accelerated to its maximum and decelerated to zero speed, as shown in FIG. 1 by curve (C), according to the present invention. Accordingly, a look-up table is provided in the length controller LC containing a digital representation of successive standard speed reference levels corresponding to regular successive time intervals. The area under the speed profile actually followed by the motor drive corresponds to the intended length L. The curve (C) has a trajectory from zero to maximum speed through a time interval $T_c$=the duty cycle period. The length is proportional to the area under the speed profile, with the limits for integration of $\omega(t)=4(t-t^2)$ being $t=0$ and $t=T_C$ where $T_c$ is the duty cycle period. Typically, each data in the look-up table of the length controller contains predetermined normalized values of the speed reference along fifty points of the speed reference for the acceleration or deceleration profile. The operating points for acceleration are in fact the mirror image of those for deceleration. Thus, the 50 stored operating points define a succession of 100 points across the entire profile, e.g., with 100 successive time intervals $\Delta T = T_c/100$. An illustration of stored data for such fifty points is given by the following look-up table:

| LOOK-UP TABLE (REF) |
|---|
| 02595,05138,07628,10066,12452 |
| 14785,17066,19294,21470,23593 |
| 25664,27682,29648,31562,33423 |
| 35232,36989,38692,40344,41943 |
| 43490,44984,46426,47815,49152 |
| 50437,51669,52848,43975,55050 |
| 56073,57043,57960,58825,59638 |
| 60398,61106,61761,62364,62915 |
| 63413,63858,64251,64592,64881 |
| 65117,65300,65431,65510,65535 |

Where 02505 is REF$=(t-t^2)$ and $t=0.01$; and where 65535 is REF$=4(t-t^2)$ and $t=0.5$, at the two extremes of the look-up table.

Referring to FIG. 6, on bus lines BL2 such REF values appear successively as digital values within the time interval $T_c$, which are compared with the actual speed feedback, also in digital form on bus lines BL2. The data from the length controller operate as a speed reference against the speed feedback signal. The feedback loops through voltage control loop VL and current control (CS) loop will regulate the armature current by means of the gate pulse generator and voltage regulator unit GVR and the rectifier converter unit RCT, within the basic power converter PC. As a result, the feedback speed from the speed sensor SS will be brought to match the speed reference from the length controller. This process occurs very quickly for each of the fifty successive points which make up the look-up table. As shown in FIG. 1, the characteristic curve is formulated in per-unit-speed and per-unit of time and so are the data in the look-up table. A pointer is used to access the current speed reference normalized values addressed in one direction for acceleration, in the opposite direction for deceleration. The value derived at each operating point is, then, scaled-up in accordance with the maximum speed value compatible for the particular cut-length and the assigned duty cycle. This allows to compute the speed reference in the small fraction of time available between two consecutive speed reference updates along the particular succession of, say fifty, normalized values in the look-up table.

Figure 11:
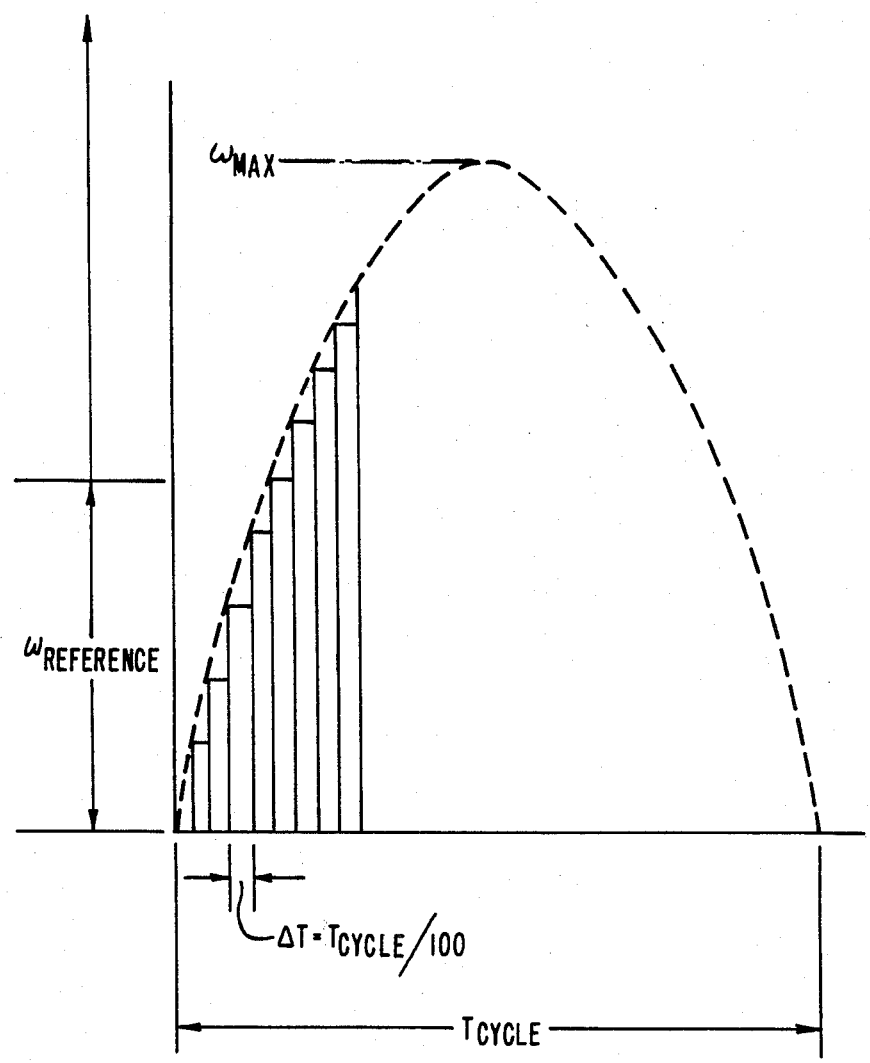
FIG. 11 shows in a two-dimensional representation the operating points selected for the standard acceleration/deceleration profile stored as a look-up table in the length controller according to the invention.

FIG. 11 shows the normalized curve, typically for a hundred operating points, each operating point having an ordinate REF$=\bar{\omega}_{REF}$, e.g., the normalized speed reference given by the look-up table. Indeed, the look-up table applies to both sides of the curve, since these are the mirror images one from the other. Thus, fifty values only of $\omega_{REF}$ need to be stored for the whole curve. Each value is derived as a reference during one hundredth the time of the duty-cycle period $T_c$. If the normalized value is 60 SPM, or 1 second for a duty-cycle period $T_c$, each time interval $\Delta t$ from one operating point to the next lasts 10 milliseconds. The operating point eventually reaches a maximum speed which is $\omega_{MAX}$ at the peak. Similarly, when scaling up the curve to actual value $T_c$, the TCOUNT for the duty-cycle period will be determined for the horizontal axis of the acceleration/deceleration profile. In this regard, it should be observed that, in practice, the optimum profile will be used 90% of the time, thereby reserving 10% of the time to coasting to the home position. Therefore, if the standard duty cycle is 1 sec. for 60 SPM, 9/10 of a second is used for acceleration and deceleration, while 1/10 of a second is reserved for homing to zero position. Thus, for 50 intervals $\Delta T$ during acceleration, or deceleration, each interval will be a count of 11364 in the real time counter.

When establishing the lengths in the look-up table, the speed profile plotting for each length takes into account (1) the duty cycle, and stroke-per-minute (SPM) of the motor drive and (2) the maximum speed to be reached under the motor rating.

Figure 12B:
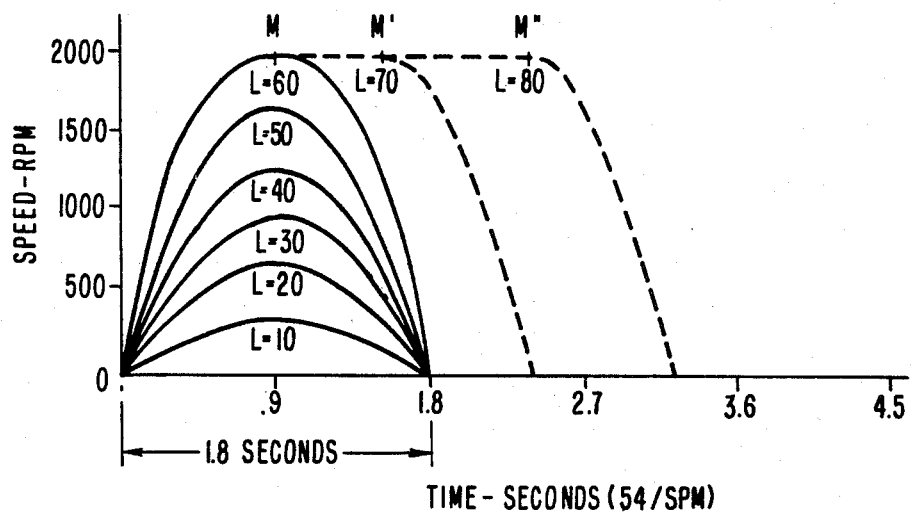
FIG. 12B defines by curves the length range for a common duty cycle and the provision for a flat profile made whenever the length exceeds the limit defined by the maximum speed attainable with the particular motor drive.
Figure 12A:
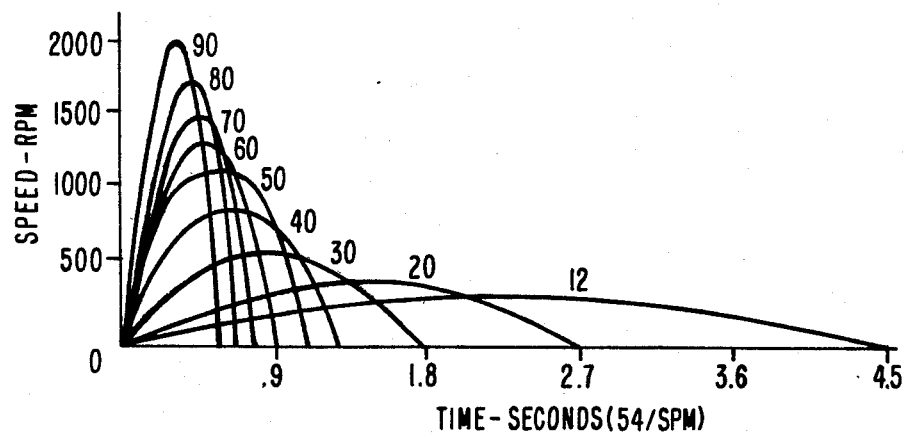
FIG. 12A shows curves illustrating for a common length value defined by the area under the curve contour the speed peak ranges and duty-cycle ranges possible.

Referring to FIG. 12A, the length cut being the same, it appears that for a high duty cycle ($T_c$ below 0.9 second) the peak M of the speed profile curve of FIG. 1 may be as high as a rated speed of 2000 rpm, whereas for a low SPM ($T_c$ as high as 4.5 seconds) the peak is much lower, as low as 450 rpm, the area under the curves being the same. The curves of FIG. 12A correspond to a length of 20 inches with SPM varying from 12 to 90 SPM. The curves show the speed reference and drive response for varying cut-length requirements ranging from 10 inches to 100 inches, and fixed SPM requirements ranging from 12 SPM to 60 SPM. At low values of cut-length requirement by the length controller, the drive speed is below the rated speed. At higher values of cut length, the maximum SPM is limited typically to 60 SPM, which is a rated value $S_R$. This limitation is enforced by the controller software in order to avoid obtaining high SPM while curtailing the cut-length requirement. As length increases, the SPM capability reduces. Typical maximum values of SPM attainable at various cut-length requirements are given by the following Table:

TABLE I

| LENGTH | 10 | 20 | 30 | 40 | 50 | 60 | 70 | 80 | 90 | 100 |
|---|---|---|---|---|---|---|---|---|---|---|
| SPM | 180 | 90 | 60 | 45 | 36 | 30 | 26 | 22 | 20 | 18 |

The plotted curves in terms of drive speed reference and speed response for varying lengths of 10 to 60 and a SPM of 60 are shown in FIG. 12A.

Referring to FIG. 12B, speed reference and drive response have been plotted for varying cut-length ranging from 10 inches to 60 inches, each for a fixed SPM of 30. For low values of programmed cut-lengths the drive operates at speeds below the rated speed, i.e., 2000 rpm. The drive follows the optimal parabolic speed profile as long as the programmed length-SPM product does not exceed the rated length-SPM product, and it therefore attains the SMP requirements also. However, when a larger value of length is programmed in the length controller, the drive quickly reaches the maximum possible speed, i.e., the rated speed (here 2000 rpm). In such a case, according to another embodiment of the invention, the length controller is so programmed that the rated speed is held before initiating the deceleration profile so as to permit the required cut-length, e.g., the duty cyle period $T_c$ to be reached. In such case, the SPM that can be attained will be limited as a result of the length requirement.

Thus, in order to maintain the required cut-length, a flat speed profile is established as shown in dotted line up to operative point M', M" or M''' in FIG. 12B.

The motor drive length controller is designed to follow the optimal parabolic speed profile whenever the product of the programmed length L by the SPM value S assigned to the drive does not exceed the rated length $L_R$ multiplied by the rates SPM value $S_R$. Whenever a value in excess of such maximum value $L_R$ is desired the maximum speed $\omega_{MAX}$ will be maintained, after it has been reached by acceleration, until the required cut-length is achieved. This is shown in dotted line by the flat profile MM', or MM" on FIG. 12B. This will appear more clearly from a consideration of the flow charts illustrating the operation of the length controller according to the invention, hereinafter.

For the purpose of illustration, the invention will now be described in the context of a flying-die like shown in FIG. 5.

For the flying-die, the production rate in CUTS PER MINUTE for varying cut-lengths and material velocities is defined by successive operating points, each for a specific amount of die-travel required before the shearing press is actuated for the cut. The length controller provides the command signals to the speed regulated servo-drive referring to achieve the required die-travel.

Based on the rated material velocity and the production rate, the rated cut-length $L_R$ is defined as follows:

$$L_R = T_{cR} \times S_R$$

where, $$T_{cR} \text{ is the rated duty-cycle period} = \frac{60 \text{ strokes per minute}}{\text{maximum cuts per minute}}$$

and where $S_R$ is the rated velocity of material in inches/sec.

All programmed lengths L and duty-cyle periods $T_c$ at varying material velocities can be expressed in normalized units as follows:

$$T_c = \frac{L}{S} \text{ seconds}; \ \overline{L} = \frac{L}{L_R}; \ \overline{S} = \frac{S}{S_R}; \text{ and}$$

$$\overline{T}_c = \frac{T_c}{T_{cR}} = \frac{1}{S \cdot T_{cR}} = \frac{L}{S(L_R/S_R)}$$

Figure 13:
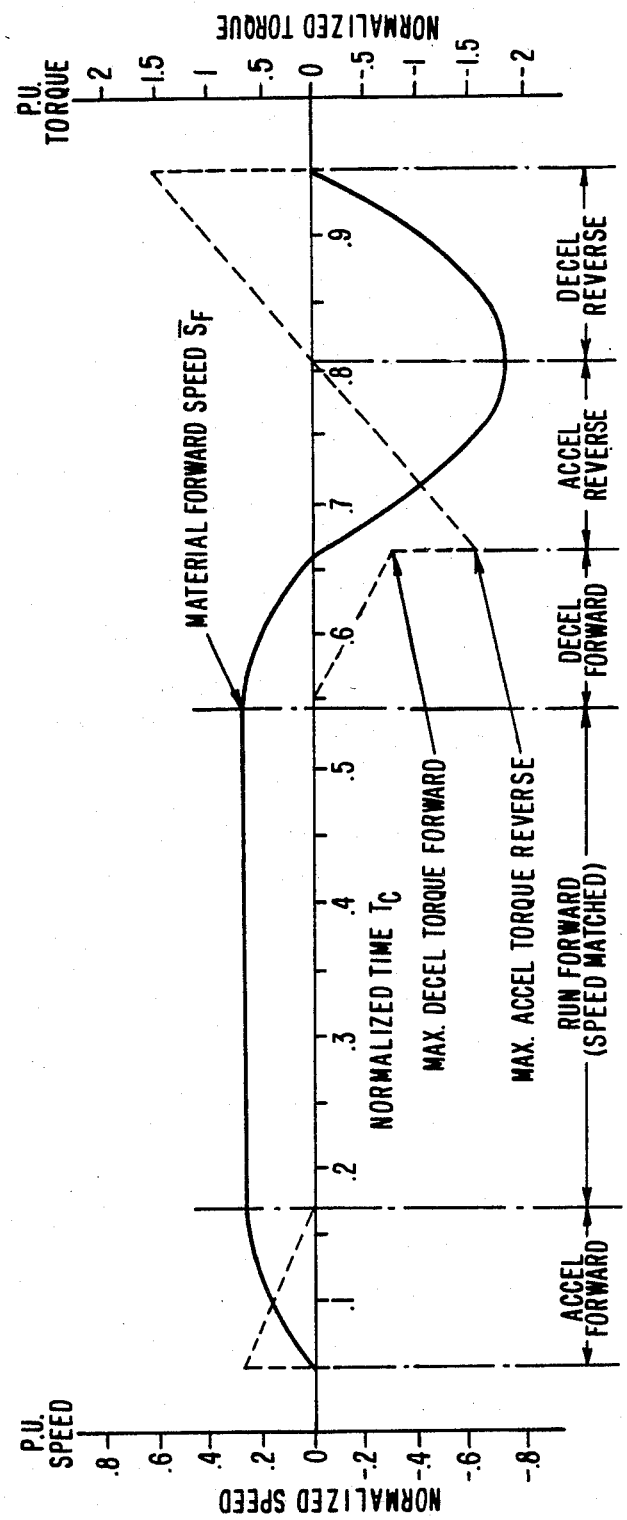
FIG. 13 illustrates another embodiment of the invention, where as with a flying-die shear two acceleration and deceleration profiles are required successively, one for effective work in one direction of movement, the other for the return to home position in the opposite direction of movement.

Since the die must accelerate and match in speed the material velocity $\overline{S}$, the total die travel can be determined from the area under the speed curve for the motion. A generalized operating cycle is shown in FIG. 13. FIG. 13 shows the active phase of the flying-die having (1) a parabolic forward acceleration zone, (2) a flat profile, in this instance chosen for illustration, during which the material is speed matched with the forward run of the flying die at material forward speed ($\overline{S}_F$) from the feed rolls, and (3) a parabolic forward deceleration zone. During the latter zone of operation, the torque is decelerating linearly like during the preceding forward acceleration zone. At the end of the forward deceleration zone, the flying-die stops and returns following an optimal parabolic curve including an acceleration and a deceleration in reverse. The total running period P extends from the initialization of the parabolic forward acceleration onto the finalization of the parabolic reverse deceleration, whereas the lateral travel of the die with the material depends on the area under the forward profile. FIG. 13 shows the standard motion characteristic in normalized time $T_c$ for the duty cycle, normalized speed S (per-unit) for the material and normalized torque $\bar{T}$ (per-unit) for the motor drive. The acceleration and deceleration periods are kept proportional to the material velocity and the running period (P) under speed match is controlled so as to provide the desired die travel between its minimum and maximum limits. This allows for maximum return time for the die.

The length controller according to the invention will now be described with respect to press-feed applications by the operative steps involved. Several main operative steps may be identified as follows:

(1) The operator chooses the length L to be cut in a batch of say ten cut-lengths, and sets the system accordingly.

(2) The operator sets the duty-cycle for the motor drive, for instance S=60 strokes per minute, e.g., with an effective duty-cycle $T_c=0.9$ sec.

(3) The operator sets the maximum speed $\omega_{MAX}$ allowable for the particular motor drive actually coupled with the length controller according to the invention.

(4) In accordance with the chosen values of L and S, the system automatically derives reference speeds as a function of time from a normalized look-up table, e.g., the appropriate parabolic speed profile in per-unit of SPM and per-unit of time. For instance, such normalized parabole in the look-up table contains 50 operating points having speed increments, or decrements, from one operating point to the next.

(5) If the length L exceeds the rated length $L_R$ obtainable with the standard parabolic speed profile, a flat profile at maximum speed is inserted between the acceleration and the deceleration portions of the parabolic profile. The system calculates the square area of the added flat profile and determines the number N of time intervals $\Delta T$ which are required to attain the length L in excess of the rated length $L_R$.

(6) Based on the maximum speed $\omega_{MAX}$ to be reached, a scaling factor K for the selected speed profile, wit or without a flat profile, is determined.

(7) Each of the 100 operative points of FIG. 11 are derived by scaling from the standard speed profile, and each outputted normalized speed reference appears scaled up by the scaling factor K upon each of the 100 successively derived reference levels in the acceleration and deceleration profile, plus, if a flat profile is required, N additional operative points at maximum speed. As a matter of fact, the look-up table preferably contains only half of the operative points (50 for a total of 100). Parabolic acceleration is obtained by scanning the incremental values whereas parabolic deceleration is obtained by decrementing the same values. The programmed operation will automatically derive either the acceleration levels or the deceleration levels from the stored data stored in the look-up table.

(8) At each operating point, the speed controller compares the feedback signal derived from the pulse tachometer with the speed reference from the length controller and for each error detected the motor drive is controlled and regulated so as to follow the intended speed profile both as to peak speed and duty-cycle time period, thereby to cause a cutting, shearing or pressing operation at the intended length L distance.

With regard to the aforementioned operative steps, the flow charts of FIGS. 13 to 20 illustratively indicate how such steps are performed as part of a programmed microprocessor operation within a length controller such as illustrated in FIGS. 6 and 7.

Figure 14:
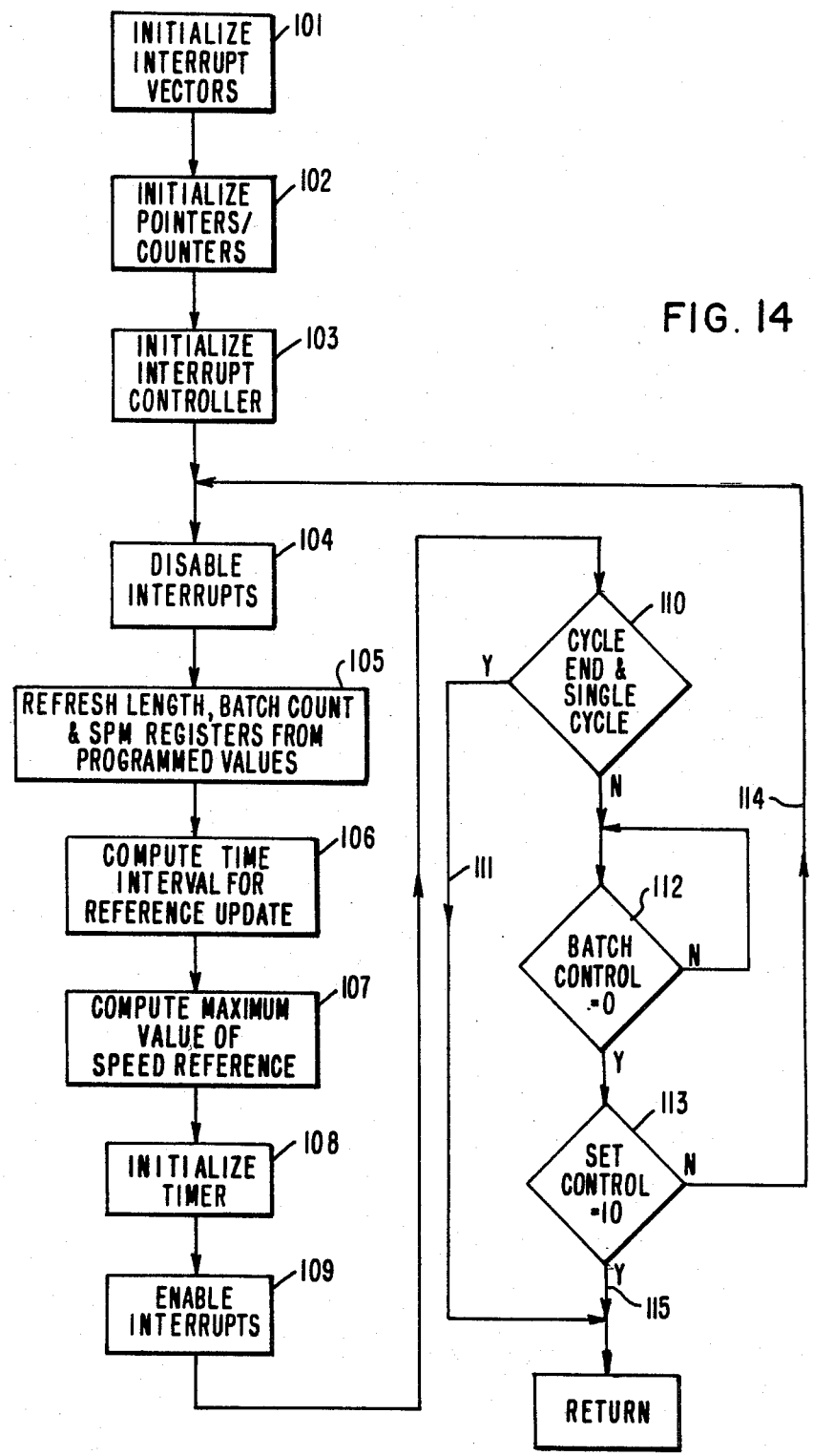
FIGS. 14-20 are flow charts illustrating the operation of the cyclic-duty motor drive of FIGS. 3-7.

FIG. 14 is a flow chart of the main routine used for the operation mode. At 101 the interrupt vectors are initialized. At 102 the pointers and counters are initialized. At 103 the interrupt controller (ITPT on FIG. 7) is initialized. At 104 the interrupts are disabled. At 105 the length is refreshed and the batch count and SPM registers are refreshed from their preceding programmed values. At 106 the time interval $\Delta t$ for speed reference update is computed. At 107 the maximum value of the speed reference is computed. At 108 the timer is initialized. At 109 the interrupts are enabled. At 110 the question is raised whether the batch operation has ended, or whether this is a single cycle. If the answer is YES, the system returns by 111. If the answer at 110 is NO, the question becomes at 112 whether the batch count is zero (single cycle) or at 113 whether the batch count has reached, typically, 10, namely the end of a batch of 10 successive cut-lengths in this instance. If the batch count is still running from zero to 10, the steps 104 through 109 are repeated from 103 via line 114.

Figure 15:
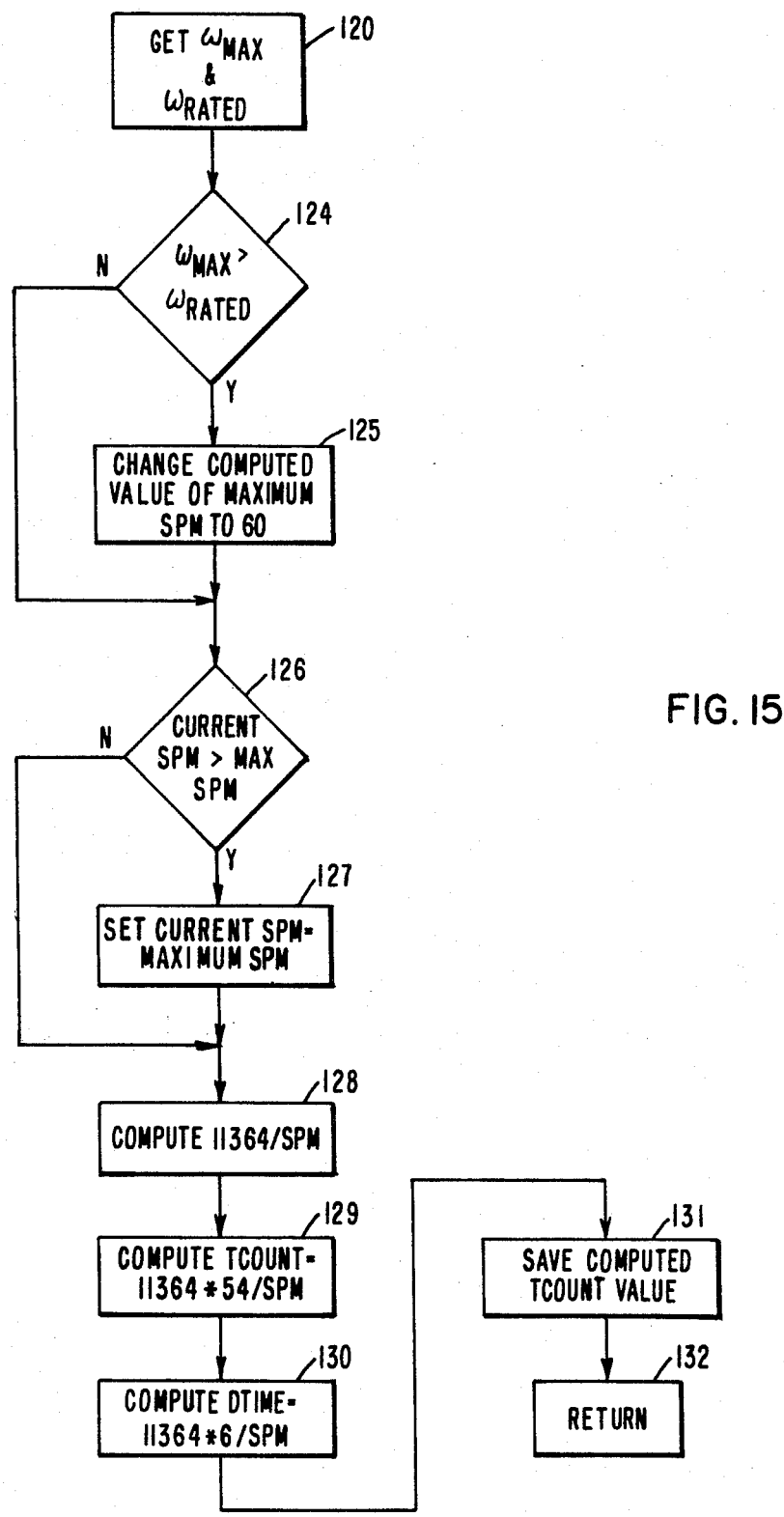

The flow chart of FIG. 15 involves the computation of duty-cycle period, e.g., the timer counter-word value:TCOUNT, that is, the duty-cycle period required by the strokes-per-minute of the operative motor drive. This corresponds to a scaled-up horizontal dimension on the time axis taken from the normalized profile curve of FIG. 11. Since the value in seconds of the duty-cycle period $T_c$ depends upon the strokes-per-minute, it is first determined whether the assigned SPM is compatible with the rated SPM of the motor drive. Thus, at 120 the values in rpm of $\omega_{MAX}$ and $\omega_R$ (motor drive rated speed) are obtained. The maximum speed $\omega_{MAX}$ corresponds to the peak value of the parabolic profile of FIG. 11 once scaled up to the actual reference speed at the peak determined under the practical conditions spelled out in FIG. 16. At 124 the question is whether $\omega_{MAX} > \omega_R$. If it is so, at 125, the maximum stroke per minute is limited to 60 strokes per minute, illustratively. Otherwise, the system goes directly to the following step, namely at 126, where the question is whether the current SPM is larger than the maximum SPM possible. If the answer at 126 is YES, at 127 the current SPM is set equal to the maximum SPM, otherwise the system goes directly from 126 to step 128. At 128, based on a counter countdown typically from a maximum preset value of 11364, the computation is done of 11364/SPM. Then, at 129, the active period TCOUNT is determined by computing 11364×54/SPM, under the assumption that the parabolic profile is used for 90% of the normalized 1 sec. $T_c$ period, e.g., 90% of 60 (SPM)=54. The remaining 10% of the time interval is 6 out of 60, which is used for coasting to the home position. The later time interval DTIME is computed at 130 by 11364×6/SPM. At 131, the TCOUNT value is stored in the register for future use (see step 164 of FIG. 17).

Figure 16:
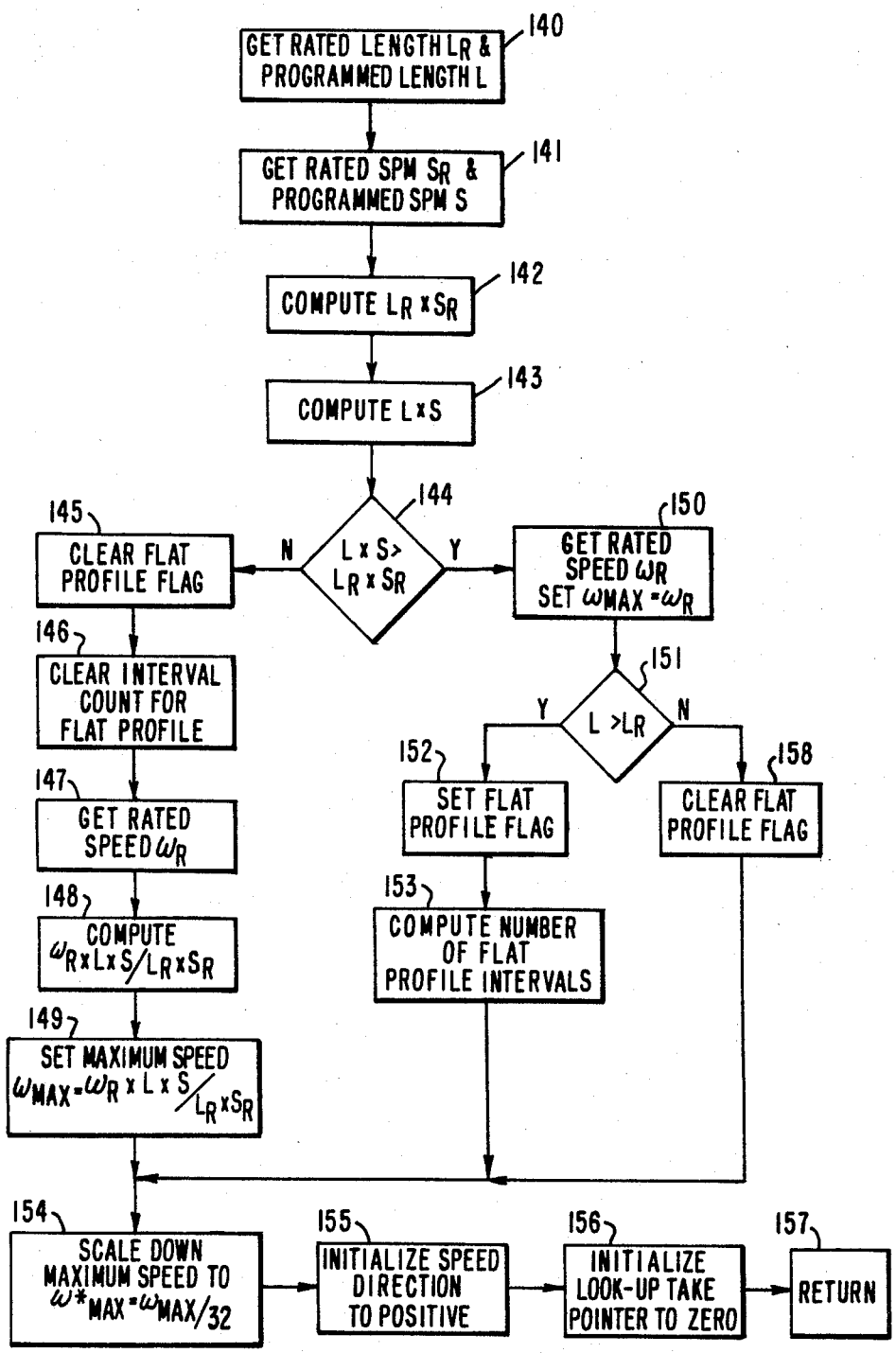

Referring to FIG. 16, the computation of the scaled-up maximum speed $\omega_{MAX}$ (used at 120 in FIG. 15) is effected as follows:

At 140 the rated length $L_R$ and the programmed length L are obtained. At 141 the rated duty cycle $S_R$ and the programmed duty cycle S are obtained (in strokes per minute). At 142 the product $L_R S_R$ is calculated. At 143 the product $L \times S$ is calculated. Then, at 144, the question is whether $L \times S \geq L_R S_R$. If it is, the system goes to the right asking for the use of a flat profile such as shown by FIG. 12B. If $L \times S < L_S \times S_R$, the system goes to the left, thus, seeking for a curve rather like those of FIG. 12A. In the latter instance, from 144, the next steps are: at 145 to clear the flat profile flag; at 146 to clear the interval count for the flat profile trajectory; at 147 to get the rated speed $\omega_R$; at 148 to compute $\omega_R \times L \times S/L_R \times S_R$ (thereby using the results of steps 142 and 143) and at 149 to set the maximum speed $\omega_{MAX}$ to be reached by computing: $\omega_{MAX} = \omega_R \times L_R \times S_R/L \times S$, thus using the result of step 148.

If a flat profile is required at step 144, the step succession becomes: at 150 the rated speed $\omega_R$ is obtained and $\omega_{MAX}$ is set at the $\omega_R$ level; at 151 the question is whether $L > L_R$. If it is, the flat profile is set at 152 and, at 153, the number N of time intervals required to build the flat profile is established in accordance with FIG. 8. If at 151 the answer is NO, the flat profile flag is cleared at 158. From step 149, step 153 or step 158, the system goes to step 154, where the maximum speed $\omega_{MAX}$ is scaled down by $\omega_{MAX}/32$. This is typically, in order to accommodate the limit at the input of the D/A converter of the controller, thereby establishing for $\omega^*_{MAX}$ a practical value. The scaled-down value of $\omega_{MAX}$ is utilized in establishing the speed reference signal at the output of the length controller in accordance with the flow chart of FIGS. 19A, 19B, as explained hereinafter. At step 155 the speed direction to positive is initialized, and at 156 the look-up table is initialized by placing the pointer to zero. At 157 the system returns.

Figure 17:
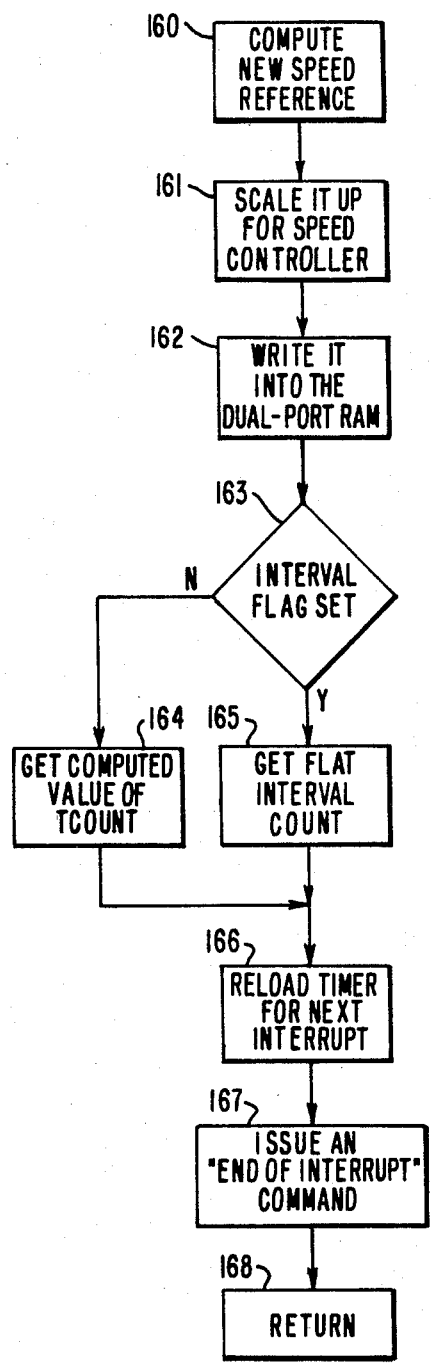
Figure 19A:
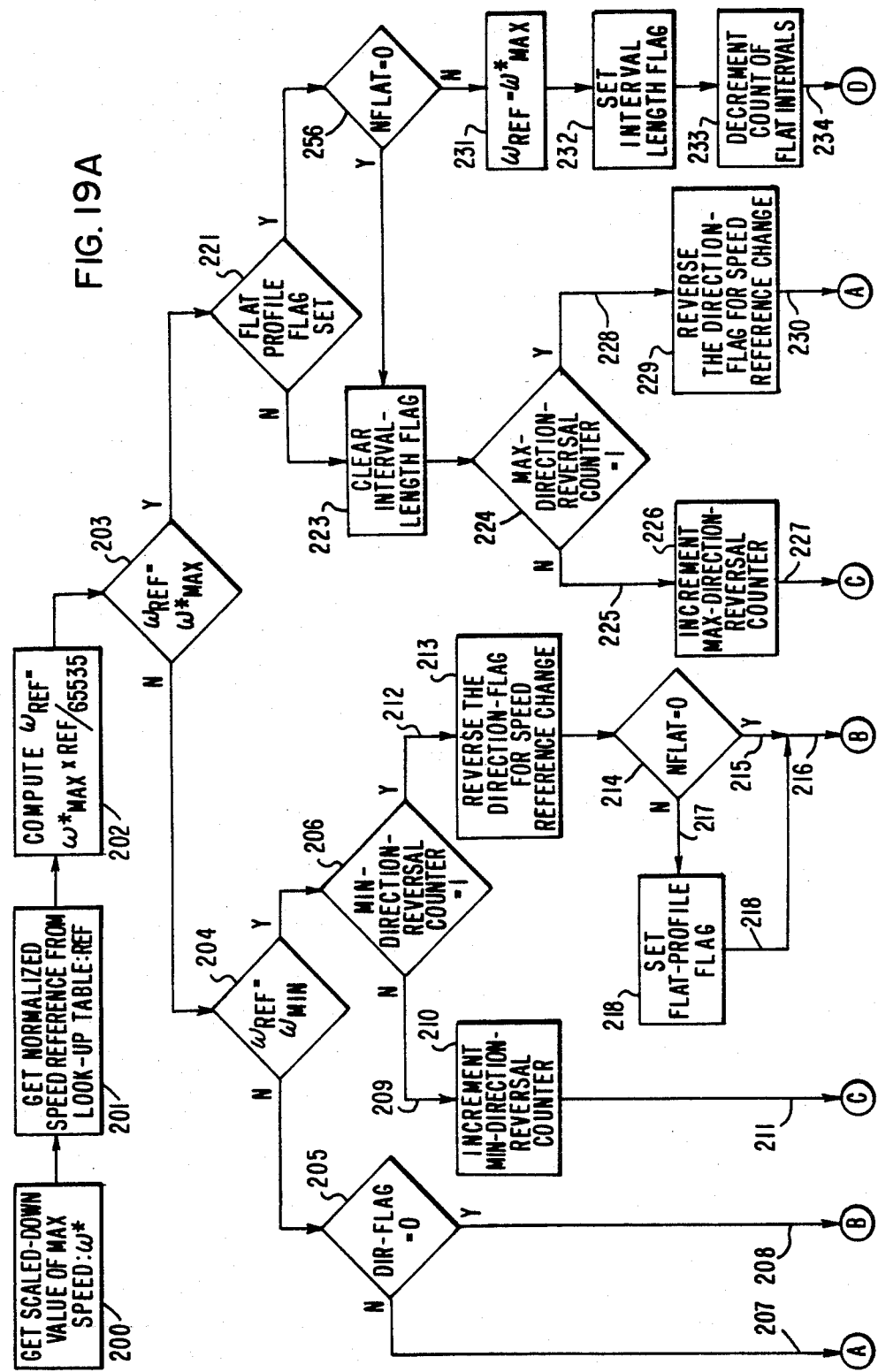
Figure 19B:
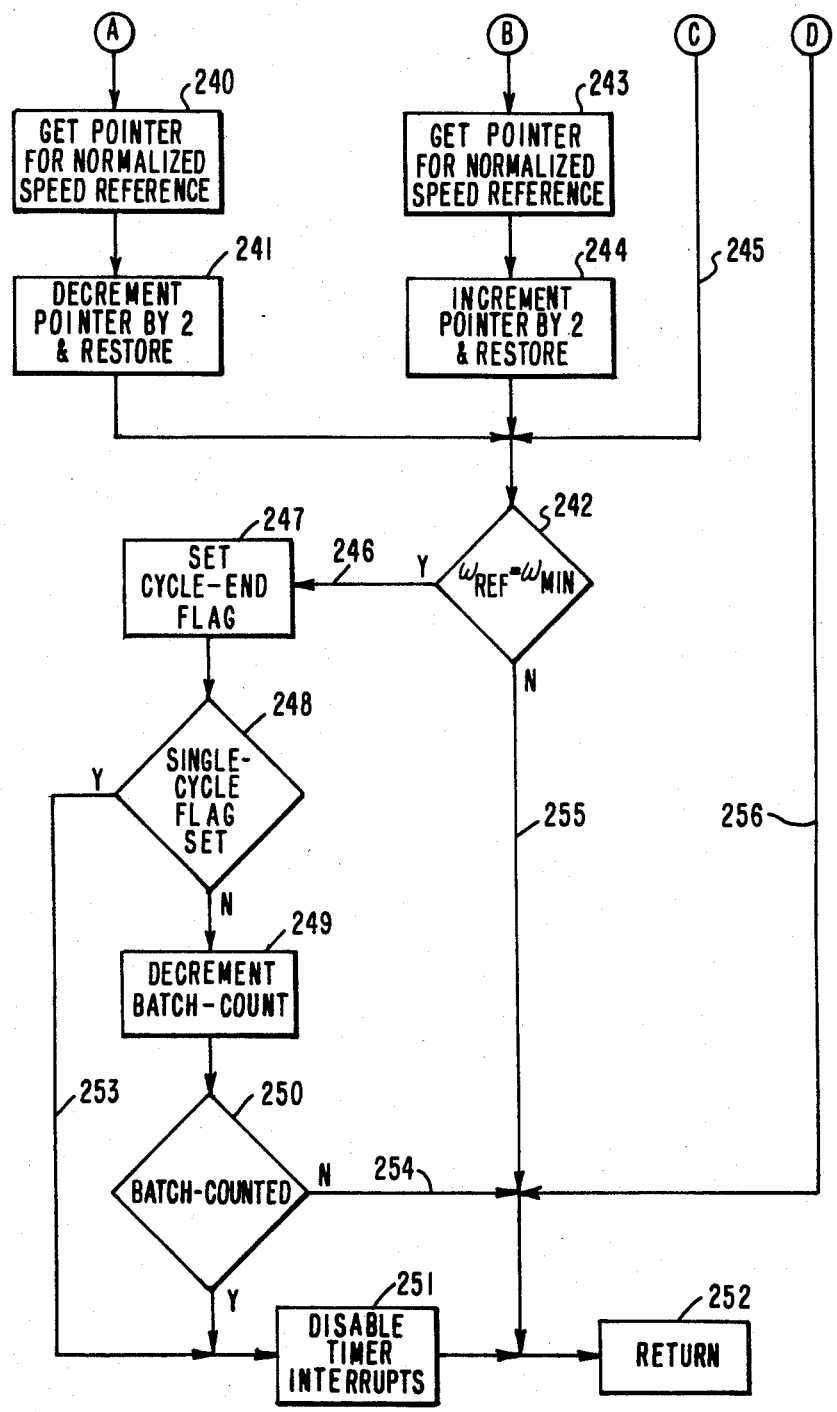

Referring to the flow chart of FIG. 17, at 160 a new speed reference is computed according to FIGS. 19A and 19B. At 161 it is stored in the RAM portion of the memory unit MU. At 163 the question is whether the interval flag has been set. If YES, the N count for the flat profile is obtained at 165. If not, the computed value TCOUNT is obtained at 164. Then, at 166 from 164 or 165, the time is reloaded for the next interrupt. At 167 an "end of interrupt" command is issued. The system returns at 168.

Figure 18:
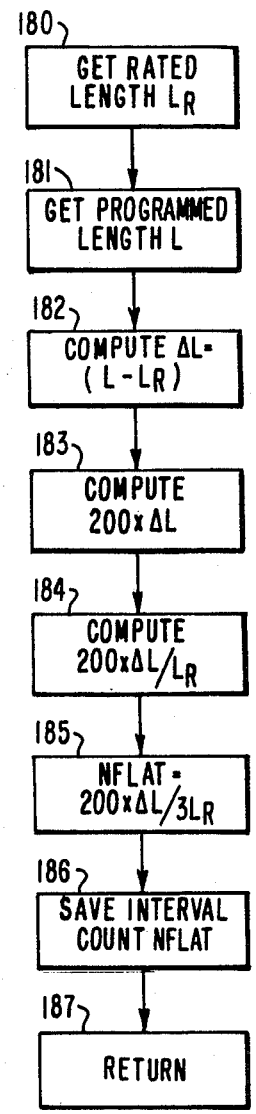

Referring to FIG. 18: at 180 the rated length $L_R$ is obtained; the programmed length L is obtained at 181; at 181 the difference $(L - L_R) = \Delta L$ is computed. $\Delta L$ is used at 183 to compute $200 \times \Delta L$; at 184 to compute $200 \times \Delta L/L_R$; at 185 to compute $200 \times \Delta L/3L_R$ which is the number N of $\Delta T$'s required to build up the flat profile, while using the formula $N = 200 \times (L - L_R)/3L_R$. The count N is saved at 186 to be used at step 233 of the flow chart of FIG. 19A, as explained hereinafter. At 187 the system returns.

Referring to FIGS. 19A, 19B, computation of the speed reference to be outputted by the length controller, based on the look-up table reference REF (FIG. 11), for acceleration deceleration with or without flat profile (FIGS. 12A, 12B), will be now illustrated by the following steps:

At 200 the scaled-down value $\omega^*_{MAX}$, of the step 151 in the flow chart of FIG. 16, is obtained. At 201 the value REF is obtained from the look-up table. At 202 the computation $\omega_{REF} = \omega^*_{MAX} \times REF/65535$ is effected, taking into account that the maximum value in the look-up table is the maximum 16-bit value 65335. At 203 the question is raised whether $\omega_{REF}$, the instantaneous operating point on the speed profile of FIG. 1 (based on REF, selected by the pointer of the look-up table, on the normalized profile of FIG. 11) is equal to $\omega^*_{AX}$. If it is, the operating point is at the peak of the curve following acceleration, or preceding deceleration. If it is not, the operating point is between one minimum position on the time axis, (e.g., on the left before acceleration, or on the right following deceleration) and the maximum position. If at 205 the flag direction is a zero, this means that by B the operating point is on the acceleration trajectory. At 243 the pointer is obtained for normalized speed reference and in the look-up table the pointer is incremented by 2 and restored. If at 205 the flag direction is a ONE, this means that by A the operating point is on the deceleration trajectory. At 240 the pointer is obtained for normalized speed reference and in the look-up table the pointer is decremented by 2 and restored. While incrementing, at 242 the answer to $\omega_{REF} = \omega_{MIN}$ eventually becomes YES and by 246, the questions are: At 247 whether the operation is for a single cycle, which means at 247 the cycle-end flag has been set, and that at 248 the question has been raised whether the single-cycle flag has been set. If YES, by 253, the timer interrupts are disabled at 251 and the system returns at 252. If NO, the batch-count at 249 is decremented until completed by a YES at 250. Otherwise, a NO causes a return by 254.

If at 203 the answer to $\omega_{REF} = \omega^*_{MAX}$ is YES, the system looks whether a flat REF profile has to be inserted (MM', MM" in FIG. 12B). To this effect, a 221 the question is whether a flat profile flag has been set. If NO, the interval-length flag is cleared at 223 and at 224 the question is raised whether the maximum direction reversal counter is set at ONE or not. If NO at 224, the counter is set to ONE at 226 and the system proceeds by 245, and 255. If at 224 the answer is YES, via 228 the next step is at 229 to reverse the direction flag, thereby to reverse the speed reference direction. As a result, by 230, 240 and 241, the aforementioned deceleration process is effected.

It is assumed now that a flat profile is required, e.g., that the answer at 221 is YES. In such case N flat as computed at step 185 of the flow chart of FIG. 18 is not zero. Therefore a NO at 256 leads at 231 to setting $\omega_{REF} = \omega^*_{MAX}$, that is, maintaining maximum speed. At 232 the interval-length flag is set and at 233 the N flat count is counted down. Upon each decrement the system returns by 256 to question 256. When the count reaches ZERO, at 256 the answer becomes YES and the steps required for deceleration via 228 and 230 are allowed.

Figure 20:
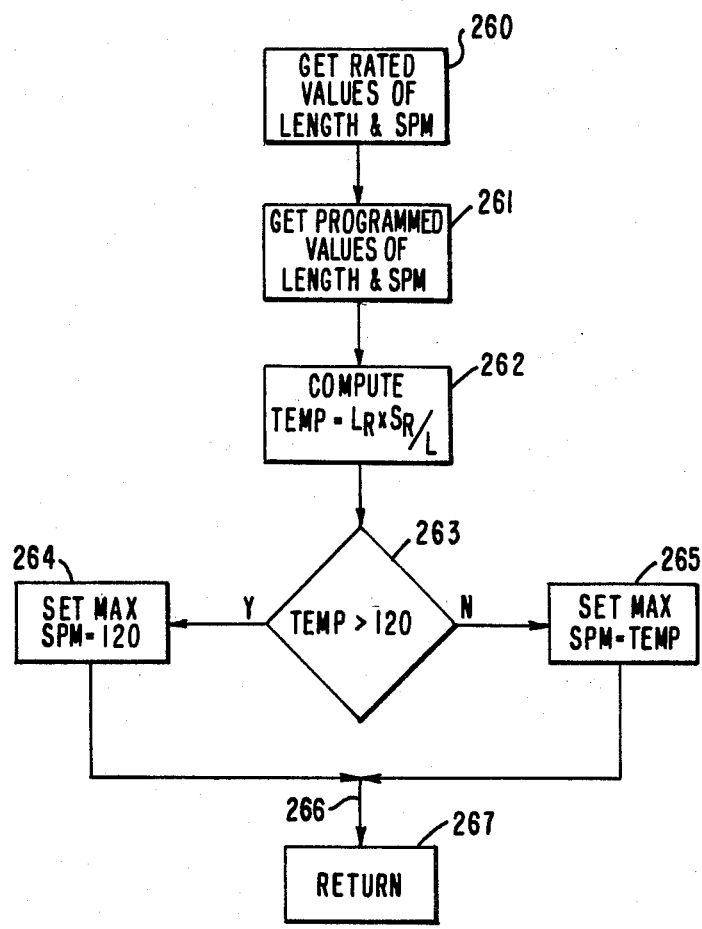

Referring to FIG. 20, the flow chart shown illustrates the computation of the maximum SPM to be achieved. At 260 the rated values $L_R$ and $S_R$ for the length and the SPM are obtained. At 261 the programmed values of L and S for the length and the SPM are obtained. At 262 the computation $TEMP = L_R \times S_R/L$ is effected. At 263 the question becomes whether $TEMP > 120$, under the assumption that the minimum reference update interval is 5 milliseconds, e.g., $S = 120$ SPM. If the answer is YES, the SPM is set at its maximum 120, namely at step 264. If the answer is NO, the maximum at 265 is chosen to be the value of TEMP. By 266 and 267 the system returns.

From the preceding, it appears that a general-purpose length controller has been conceived and implemented, providing under selected values of length, and strokes-per-minute, under the limitations of a cyclic-duty motor drive having rated speed and rated duty-cycle, a speed profile for acceleration and deceleration which insures minimization of the losses, as well as the required length for material processing. It is understood, that the embodiments of this invention have been given for illustration only. For instance, the operating points on the speed profile of the curve of FIG. 11, need not be occurring at equal time intervals ΔT. Also, the feed-to-stop, rotary shear and slide-die or flying cut-off constitute only examples of applications of the invention in the more general context of cyclic-duty motor drives.

APPENDIX

The solution to the problem of minimizing the function:

$$I(\omega) = \int_0^{(\frac{1}{2})t_R} \bar{\tau}^2 \, dt$$

under the constraints:

$$\bar{\tau} = \bar{\tau}_L + \frac{J\omega_R}{\tau_R} \cdot \frac{d\bar{\omega}}{dt}$$

$$\int_0^{(\frac{1}{2})t_R} \bar{\omega} \, dt = \frac{L}{2\pi D_r \omega_R} \, ; \, \bar{\omega}(0) = 0; \, \bar{\omega}(\tfrac{1}{2}[t_R]) = 0$$

may be carried out by using the generalized form of the Euler's equation as follows:

$$\frac{\partial F}{\partial \omega} - \frac{d}{dt} \cdot \frac{\partial F}{\partial \dot{\omega}} + \lambda \left( \frac{\partial G}{d\omega} - \frac{d}{dt} \cdot \frac{\partial G}{\partial \dot{\omega}} \right) = 0 \quad (1)$$

where, $$F = \tau^2 = \left( \tau_L + \frac{J\omega_R}{\tau_R} \cdot \frac{d\omega^2}{dt} \right)^2$$

$$= \tau_L^2 + \frac{2J\omega_R \tau_L}{\tau_R} \cdot \dot{\omega} + \frac{J^2 \omega_R^2}{\tau_R^2} (\dot{\omega})^2 \quad (2)$$

where $G = \bar{\omega}$: $\lambda$ is the Lagrange multiplier.

$$\frac{\partial F}{\partial \bar{\omega}} = 0; \quad \frac{\partial F}{\partial \dot{\bar{\omega}}} = \frac{2J\omega_r \tau_L}{\tau_r} + \frac{2J^2 \omega_r^2}{\tau_r^2} \dot{\omega}$$

$$\frac{d}{dt} \frac{\partial F}{\partial \dot{\omega}} = \frac{2J^2 \omega_r^2 \ddot{\omega}}{\tau_r^2}$$

$$\frac{\partial G}{\partial \omega} = 1 \text{ and } \frac{\partial G}{\partial \dot{\omega}} = 0$$

Substituting the above partial derivatives in equation (1) yields:

$$\ddot{\bar{\omega}} = \lambda \cdot \frac{\tau_R^2}{2J^2 \omega_R^2} \quad (3)$$

A solution to this differential equation is $$\bar{\omega} = At^2 + Bt + C \quad (4)$$

The coefficients A, B & C are solved using the boundary conditions:

$$\int_0^{(\frac{1}{2})t} \bar{\omega} \, dt = \frac{1}{2} \cdot \frac{L}{\pi D_R \omega_R}$$

$$\bar{\omega}(o) = 0; \, \dot{\bar{\omega}}(t_f) = 0$$

Then, $$C = 0, \, B = -At \text{ and } A = \frac{-6L}{\pi D_r \omega_R t_R^3}$$

$$\therefore \bar{\omega} = \frac{-6L}{\pi D_r \omega_R t_R^3} (t^2 - t_R t)$$

$$= \frac{-6L}{\pi D_r \omega_R t_R^3} \left( \frac{t^2}{t_R^2} - \frac{t}{t_R} \right)$$

$$= \frac{6L}{\pi D_r \omega_R t_R} (\bar{t} - \bar{t}^2)$$

Where $\bar{t}$ is defined as the normalized time $t/t_R$.
For the maximum value of $\bar{\omega} = 1$ at $\bar{t} = \tfrac{1}{2}$:

$$\frac{6L}{\pi D_r \omega_R t_R} = 4$$

Therefore:

$$\bar{\omega} = 4(\bar{t} - \bar{t}^2) \quad (5)$$

and $$\omega_r = \frac{3L}{2\pi D_r t_R} \quad (6)$$

If we take the second derivative of equation (4) and compare its right hand side with that of equation (3), we can solve for λ.

I claim:

1. A cyclic-duty motor drive system for repeatedly moving a cutting tool having mass inertia from a home position to a cutting position and back in relation to a continuous elongated member of material displaced at a predetermined constant speed, said successive cutting positions being separated along said member of material by a predetermined distance L and occurring with the duty cycle S of the motor drive, the motor drive including:

a speed controller responsive to a speed reference signal for adjusting the speed of said motor drive in relation to said speed reference signal, comprising:

a length controller for applying to said speed controller a signal representative of a desired length L between said two positions and a signal representing a desired duty cycle;

memory means having stored therein digital data representing a standard parabolic speed profile as a function of time of standard maximum speed $\omega_{MAX}$ and a standard time interval between initial and final zero speeds on said profile;

means responsive to said length representative signal and to said duty cycle representative signal and operative with said memory means for generating, as said desired length signal and duty cycle signal, modified digital data representing a scaled profile derived from said stored digital data standard parabolic speed profile said speed controller being responsive to said modified data for generating as a function of time said speed reference signal in relation to said scaled profile;

whereby said cutting tool is accelerated from zero speed to maximum speed and decelerated to zero speed in accordance with said scaled parabolic profile between said home and cutting positions.

2. The system of claim 1, with said length controller including a microprocessor for calculating $\omega_{MAX}=\omega_R L \times S/L_R S_R$ where $\omega_R$ is the rated speed, $L_R$ the rated length, $S_R$ the rated duty cycle in stroke per minute, L the desired length, S the desired duty-cycle; and with said scaled profile being established by relating the maximum speed of the standard parabolic profile to said computed $\omega_{MAX}$ value.

3. The system of claim 2 with said scaled profile being established by relating the standard unity of time of said standard parabolic profile to the time period for the desired duty-cycle S.

4. The system of claim 3 with a flat profile at maximum speed being introduced after acceleration to maximum speed $\omega_{MAX}$ when the intended length L exceeds the rated length $L_R$ defined by such acceleration to maximum speed $\omega_{MAX}$; said microcomputer calculating the duration of said flat profile as a function of $(L-L_R)$.

5. The system of claim 4 with said microcomputer determining whether $LS \geq L_R S_R$, and establishing under such condition a maximum speed $\omega_{MAX}$ equal to $\omega_R$, the rated speed of said motor drive.

6. The system of claim 5 with said microcomputer determining whether $LS \geq L_R S_R$, and establishing a maximum speed $\omega_{MAX}$ scaled down from said $\omega_R$ value with the formula $\omega_{MAX}=\omega_R \times L \times S/L_R \times S_R$.

7. The system of claim 1 with said standard parabolic speed profile being given by the function $\bar{\omega}-4(\bar{t}-t^2)$ where $\bar{\omega}$ is the normalized speed as a function of time t, and $\bar{t}$ is the time period expressed in normalized units of time 1/S.

* * * * *